United States Patent
Far et al.

(10) Patent No.: US 11,615,256 B1
(45) Date of Patent: Mar. 28, 2023

(54) HYBRID ACCUMULATION METHOD IN MULTIPLY-ACCUMULATE FOR MACHINE LEARNING

(71) Applicant: Ali Tasdighi Far, San Jose, CA (US)

(72) Inventors: Ali Tasdighi Far, San Jose, CA (US); Michael C. Shebanow, San Jose, CA (US)

( * ) Notice: Subject to any disclaimer, the term of this patent is extended or adjusted under 35 U.S.C. 154(b) by 0 days.

(21) Appl. No.: 17/497,960

(22) Filed: Oct. 10, 2021

Related U.S. Application Data

(63) Continuation-in-part of application No. 17/097,684, filed on Nov. 13, 2020, and a continuation-in-part of
(Continued)

(51) Int. Cl.
*G06J 1/00* (2006.01)
(52) U.S. Cl.
CPC ................................. *G06J 1/00* (2013.01)
(58) Field of Classification Search
CPC ......................................................... H06J 1/00
(Continued)

(56) References Cited

U.S. PATENT DOCUMENTS

| | | |
|---|---|---|
| 3,610,906 A | 10/1971 | Stampler |
| 4,677,369 A | 6/1987 | Bowers et al. |

(Continued)

OTHER PUBLICATIONS

A. Far, "Small size class AB amplifier for energy harvesting with ultra low power, high gain, and high CMRR," 2016 IEEE International Autumn Meeting on Power, Electronics and Computing (ROPEC), Ixtapa, 2016, pp. 1-5.
(Continued)

*Primary Examiner* — Kevin M Burd

(57) ABSTRACT

Methods for performing mixed-mode Multiply-Accumulate (MAC) functions in an integrated circuit (IC) are disclosed. By performing part of the MAC operation spatially and in parallel, and part of it temporally and serially, the number of MAC operations can be programmed in the serial/temporal MAC segment as a multiple of the parallel/spatial MAC segment. Such a trait provides a degree of flexibility in programming the mixed-mode MAC function. A Programmable-Hybrid-Accumulation (PHA) method, performs the accumulation function of the MAC IC, by transforming the accumulation signal to a hybrid accumulation signal. The hybrid accumulation signal is comprised of a Most-Significant-Portion (MSP) and a Least-Significant-Portion (LSP), wherein the portions of the hybrid accumulation signal can be programmed in accordance with cost-performance objectives of an end application. Transforming the accumulated signal to a hybrid signal, and utilizing the PHA method, enables keeping the signal magnitudes bounded which prevent signal over-flow constraints while accumulation cycles proceed. Arranging a mixed-signal MAC in accordance with the PHA method can, among other benefits, help to limit the peak-to-peak analog signal swings which enhances performance attributes such as lower current consumption, faster speed, lower power supply voltage, and a wider signal accumulation range before power supply operating headroom conditions are breached.

4 Claims, 8 Drawing Sheets

Related U.S. Application Data application No. 16/997,229, filed on Aug. 19, 2020, now Pat. No. 11,144,316, and a continuation-in-part of application No. 16/925,803, filed on Jul. 10, 2020, and a continuation-in-part of application No. 16/730,539, filed on Dec. 30, 2019, now Pat. No. 11,275,909, and a continuation-in-part of application No. 16/730,446, filed on Dec. 30, 2019.

(60) Provisional application No. 63/161,646, filed on Mar. 16, 2021.

(58) Field of Classification Search
USPC .......................................................... 341/126
See application file for complete search history.

(56) References Cited

U.S. PATENT DOCUMENTS

| | | |
|---|---|---|
| 4,817,028 A | 3/1989 | Masson et al. |
| 4,827,260 A | 5/1989 | Sugawa et al. |
| 4,899,066 A | 2/1990 | Aikawa et al. |
| 5,218,246 A | 6/1993 | Lee et al. |
| 5,261,035 A | 11/1993 | Adler |
| 5,280,564 A | 1/1994 | Shioni et al. |
| 5,283,579 A | 2/1994 | Tasdighi |
| 5,289,055 A | 2/1994 | Razavi |
| 5,294,927 A | 3/1994 | Levinson et al. |
| 5,329,632 A | 7/1994 | Lee et al. |
| 5,334,888 A | 8/1994 | Bodas |
| 5,337,267 A | 8/1994 | Colavin |
| 5,391,938 A | 2/1995 | Hatsuda |
| 5,495,245 A | 2/1996 | Ahe |
| 5,523,707 A | 6/1996 | Levy et al. |
| 5,535,309 A | 7/1996 | Shin |
| 5,576,637 A | 11/1996 | Akaogi et al. |
| 5,581,661 A | 12/1996 | Wang |
| 5,583,456 A | 12/1996 | Kimura |
| 5,592,107 A | 1/1997 | McDermott |
| 5,619,444 A | 4/1997 | Agranat et al. |
| 5,629,885 A | 5/1997 | Pirson et al. |
| 5,640,084 A | 6/1997 | Tero et al. |
| 5,668,710 A | 9/1997 | Caliboso et al. |
| 5,703,588 A | 12/1997 | Rivoir et al. |
| 5,734,260 A | 3/1998 | Tasdighi et al. |
| 5,734,291 A | 3/1998 | Tasdighi et al. |
| 5,760,726 A | 6/1998 | Koifman et al. |
| 5,801,655 A | 9/1998 | Imamura |
| 5,814,995 A | 9/1998 | Tasdighi |
| 5,831,566 A | 11/1998 | Ginetti |
| 5,861,762 A | 1/1999 | Sutherland |
| 5,870,049 A | 2/1999 | Huang et al. |
| 5,923,208 A | 7/1999 | Tasdighi et al. |
| 5,966,029 A | 10/1999 | Tarrab et al. |
| 5,969,658 A | 10/1999 | Naylor |
| 6,002,354 A | 12/1999 | Itoh et al. |
| 6,005,374 A | 12/1999 | Tasdighi |
| 6,018,758 A | 1/2000 | Griesbach |
| 6,032,169 A | 2/2000 | Malzahn |
| 6,052,074 A | 4/2000 | Iida |
| 6,054,823 A | 4/2000 | Collings et al. |
| 6,072,415 A | 6/2000 | Cheng |
| 6,122,284 A | 9/2000 | Tasdighi et al. |
| 6,163,288 A | 12/2000 | Yoshizawa |
| 6,225,929 B1 | 5/2001 | Beck |
| 6,243,033 B1 | 6/2001 | Mizuno |
| 6,260,056 B1 | 7/2001 | Dalal |
| 6,298,368 B1 | 10/2001 | Miller, Jr. |
| 6,301,598 B1 | 10/2001 | Dierke et al. |
| 6,329,941 B1 | 12/2001 | Farooqi |
| 6,384,763 B1 | 5/2002 | Leung et al. |
| 6,392,574 B1 | 5/2002 | Toosky |
| 6,393,453 B1 | 5/2002 | Purcell |
| 6,424,283 B2 | 7/2002 | Bugeja et al. |
| 6,448,917 B1 | 9/2002 | Leung et al. |
| 6,463,452 B1 | 10/2002 | Schulist |
| 6,489,905 B1 | 12/2002 | Lee et al. |
| 6,507,304 B1 | 1/2003 | Lorenz |
| 6,542,098 B1 | 4/2003 | Casper et al. |
| 6,573,758 B2 | 6/2003 | Boerstler et al. |
| 6,583,744 B2 | 6/2003 | Bright |
| 6,727,728 B1 | 4/2004 | Bitting |
| 6,754,645 B2 | 6/2004 | Shi et al. |
| 6,903,579 B2 | 6/2005 | Rylov |
| 6,930,512 B2 | 8/2005 | Yin |
| 6,967,609 B1 | 11/2005 | Bicakei et al. |
| 7,003,544 B1 | 2/2006 | Langhammer |
| 7,088,138 B2 | 8/2006 | Xu et al. |
| 7,136,002 B2 | 11/2006 | Dempsey et al. |
| 7,142,014 B1 | 11/2006 | Groen et al. |
| 7,298,171 B2 | 11/2007 | Parris |
| 7,312,740 B2 | 12/2007 | Chou |
| 7,557,614 B1 | 7/2009 | Bonsels et al. |
| 7,612,583 B2 | 11/2009 | Winograd |
| 7,903,016 B1 | 3/2011 | Wyatt |
| 8,416,112 B2 | 4/2013 | Aude et al. |
| 8,558,727 B2 | 10/2013 | McGowan |
| 8,653,857 B2 | 2/2014 | Becker |
| 8,981,981 B1 | 3/2015 | Mossawir |
| 9,069,995 B1 | 6/2015 | Cronie |
| 9,384,168 B2 | 7/2016 | Mortensen |
| 9,519,304 B1 | 12/2016 | Far |
| 9,780,652 B1 | 10/2017 | Far |
| 9,921,600 B1 | 3/2018 | Far |
| 10,177,713 B1 | 1/2019 | Far |
| 10,198,022 B1 | 2/2019 | Far |
| 10,311,342 B1 | 6/2019 | Farhadi et al. |
| 10,387,740 B2 | 8/2019 | Yang et al. |
| 10,411,597 B1 | 9/2019 | Far |
| 10,491,167 B1 | 11/2019 | Far |
| 10,504,022 B2 | 12/2019 | Temam et al. |
| 10,536,117 B1 | 1/2020 | Far |
| 10,560,058 B1 | 2/2020 | Far |
| 10,581,448 B1 | 3/2020 | Far |
| 10,592,208 B2 | 3/2020 | Wang et al. |
| 10,594,334 B1 | 3/2020 | Far |
| 10,664,438 B2 | 3/2020 | Sity et al. |
| 10,621,486 B2 | 4/2020 | Yao |
| 10,684,955 B2 | 6/2020 | Luo et al. |
| 10,691,975 B2 | 6/2020 | Bagherinezhad et al. |
| 10,699,182 B2 | 6/2020 | Gulland et al. |
| 10,700,695 B1 | 6/2020 | Far |
| 10,789,046 B1 | 9/2020 | Far |
| 10,797,718 B1 | 10/2020 | Far |
| 10,804,921 B1 | 10/2020 | Far |
| 10,804,925 B1 | 10/2020 | Far |
| 10,819,283 B1 | 10/2020 | Far |
| 10,826,525 B1 | 11/2020 | Far |
| 10,832,014 B1 | 11/2020 | Far |
| 10,833,692 B1 | 11/2020 | Far |
| 10,848,167 B1 | 11/2020 | Far |
| 10,862,495 B1 | 12/2020 | Far |
| 10,862,501 B1 | 12/2020 | Far |
| 10,884,705 B1 | 1/2021 | Far |
| 10,915,298 B1 | 2/2021 | Far |
| 11,016,732 B1 | 5/2021 | Far |
| 2001/0026236 A1 | 10/2001 | Toda |
| 2001/0056455 A1 | 12/2001 | Lin |
| 2003/0225716 A1 | 12/2003 | Shi et al. |
| 2004/0181566 A1 | 9/2004 | Ettorre et al. |
| 2004/0183706 A1 | 9/2004 | Brauns et al. |
| 2005/0125477 A1 | 6/2005 | Genov et al. |
| 2005/0218984 A1 | 10/2005 | Yin |
| 2007/0086655 A1 | 4/2007 | Simard et al. |
| 2009/0045993 A1 | 2/2009 | Tokumaru et al. |
| 2009/0184855 A1 | 7/2009 | Tokumaru et al. |
| 2010/0072821 A1 | 5/2010 | Yamaguchi et al. |
| 2010/0283642 A1 | 11/2010 | Lai et al. |
| 2012/0126852 A1 | 5/2012 | Shin et al. |
| 2015/0091784 A1 | 4/2015 | Kwon et al. |
| 2016/0026912 A1 | 1/2016 | Falcon et al. |
| 2016/0065219 A1* | 3/2016 | Jayaraman ........... H03K 21/023 377/51 |
| 2016/0239706 A1 | 8/2016 | Franciscus et al. |
| 2016/0246506 A1 | 8/2016 | Hebig et al. |

(56) References Cited

U.S. PATENT DOCUMENTS

| | | | |
|---|---|---|---|
| 2016/0328647 A1 | 11/2016 | Lin et al. | |
| 2017/0200094 A1 | 7/2017 | Bruestle et al. | |
| 2018/0095748 A1* | 4/2018 | Buchanan | G06F 7/00 |
| 2019/0286953 A1 | 9/2019 | Farhadi et al. | |
| 2019/0325269 A1 | 10/2019 | Bagherinezhad et al. | |
| 2020/0117982 A1* | 4/2020 | Chiu | G06N 3/08 |
| 2020/0184037 A1 | 6/2020 | Zatloukal et al. | |
| 2020/0184044 A1 | 6/2020 | Zatloukal | |
| 2020/0390365 A1* | 12/2020 | LaBelle | A61B 5/0004 |
| 2021/0004668 A1* | 1/2021 | Moshovos | G06N 3/0454 |

OTHER PUBLICATIONS

A. Far, "Compact ultra low power class AB buffer amplifier," 2017 IEEE International Autumn Meeting on Power, Electronics and Computing (ROPEC), Ixtapa, 2017, pp. 1-6.

A. Far, "Subthreshold current reference suitable for energy harvesting: 20ppm/C and 0.1%/V at 140nW," 2015 IEEE International Autumn Meeting on Power, Electronics and Computing (ROPEC), Ixtapa, 2015, pp. 1-4.

A. Far, "Amplifier for energy harvesting: Low voltage, ultra low current, rail-to-rail input-output, high speed," 2016 IEEE International Autumn Meeting on Power, Electronics and Computing (ROPEC), Ixtapa, 2016, pp. 1-6.

A. Far, "Class AB amplifier with noise reduction, speed boost, gain enhancement, and ultra low power," 2018 IEEE 9th Latin American Symposium on Circuits & Systems (LASCAS), Puerto Vallarta, Mexico, 2018, pp. 1-4.

A. Far, "Low noise rail-to-rail amplifier runs fast at ultra low currents and targets energy harvesting," 2017 IEEE International Autumn Meeting on Power, Electronics and Computing (ROPEC), Ixtapa, 2017, pp. 1-6.

A. Far, "A 5µW fractional CMOS bandgap voltage and current reference," 2013 IEEE Global High Tech Congress on Electronics, Shenzhen, 2013, pp. 7-11.

A. Far, "A400nW CMOS bandgap voltage reference," 2013 International Conference on Electrical, Electronics and System Engineering (ICEESE), Kuala Lumpur, 2013, pp. 15-20.

A. Far, "Enhanced gain, low voltage, rail-to-rail buffer amplifier suitable for energy harvesting," 2017 IEEE International Autumn Meeting on Power, Electronics and Computing (ROPEC), Ixtapa, 2017, pp. 1-6.

A. Far, "Subthreshold bandgap voltage reference aiming for energy harvesting: 100na, 5 ppm/c, 40 ppm/v, psrr -88db," 2015 IEEE 5th International Conference on Consumer Electronics—Berlin (ICCE-Berlin), Berlin, 2015, pp. 310-313.

A. Far, "A220nA bandgap reference with 80dB PSRR targeting energy harvesting," 2016 IEEE Canadian Conference on Electrical and Computer Engineering (CCECE), Vancouver, BC, 2016, pp. 1-4.

A. Far, "Sub-1 volt class AB amplifier with low noise, ultra low power, high-speed, using winner-take-all," 2018 IEEE 9th Latin American Symposium on Circuits & Systems (LASCAS), Puerto Vallarta, Mexico, 2018, pp. 1-4.

A. Far, "A low supply voltage 2µW half bandgap reference in standard sub-µ CMOS," 2014 IEEE International Conference on Electronics, Computing and Communication Technologies (CONECCT), Bangalore, 2014, pp. 1-5.

A. Far, "Current reference for energy harvesting: 50um per side, At 70 nW, regulating to 125C," 2014 IEEE International Autumn Meeting on Power, Electronics and Computing (ROPEC), Ixtapa, 2014, pp. 1-5.

Qing Dong et al., "A 0.3V VDDmin 4+2T SRAM for searching and in-memory computing using 55nm DDC technology," 2017 Symposium on VLSI Circuits, Kyoto, 2017, pp. C160-C161, doi: 10.23919/VLSIC.2017.8008465.

Yen-Cheng Chiu et al., "A 4-Kb 1-to-8-bit Configurable 6T SRAM-Based Computation-in-Memory Unit-Macro for CNN-Based AI Edge Processors," in IEEE Journal of Solid-State Circuits, doi: 10.1109/JSSC.2020.3005754, 2020.

Jingcheng Wang et al., "A 28-nm Compute SRAM With Bit-Serial Logic/Arithmetic Operations for Programmable In-Memory Vector Computing," in IEEE Journal of Solid-State Circuits, vol. 55, No. 1, pp. 76-86, Jan. 2020, doi: 10.1109/JSSC.2019.2939682.

Daniel Bankman et al., "An Always-On 3.8 $\mu$ J/86% CIFAR-10 Mixed-Signal Binary CNN Processor With All Memory on Chip in 28-nm CMOS," in IEEE Journal of Solid-State Circuits, vol. 54, No. 1, pp. 158-172, Jan. 2019, doi: 10.1109/JSSC.2018.2869150.

Gobinda Saha et al "An Energy-Efficient and High Throughput in-Memory Computing Bit-Cell With Excellent Robustness Under Process Variations for Binary Neural Network," in IEEE Access, vol. 8, pp. 91405-91414, 2020, doi: 10.1109/ACCESS.2020.2993989.

Han-Chun Chen et al., "Configurable 8T SRAM for Enbling in-Memory Computing," 2019 2nd International Conference on Communication Engineering and Technology (ICCET), Nagoya, Japan, 2019, pp. 139-142, doi: 10.1109/ICCET.2019.8726871.

James Clay et al., "Energy-efficient and reliable in-memory classifier for machine-learning applications," in IET Computers & Digital Techniques, vol. 13, No. 6, pp. 443-452, 11 2019, doi: 10.1049/iet-cdt.2019.0040.

Naveen Verma et al., "In-Memory Computing: Advances and Prospects," in IEEE Solid-State Circuits Magazine, vol. 11, No. 3, pp. 43-55, Summer 2019, doi: 10.1109/MSSC.2019.2922889.

Yu Wang, "Neural Networks on Chip: From CMOS Accelerators to In-Memory-Computing," 2018 31st IEEE International System-on-Chip Conference (SOCC), Arlington, VA, 2018, pp. 1-3, doi: 10.1109/SOCC.2018.8618496.

Hossein Valavi et al., "A Mixed-Signal Binarized Convolutional-Neural-Network Accelerator Integrating Dense Weight Storage and Multiplication for Reduced Data Movement," 2018 IEEE Symposium on VLSI Circuits, Honolulu, HI, 2018, pp. 141-142, doi: 10.1109/VLSIC.2018.8502421.

Hossein Valavi et al., "A 64-Tile 2.4-Mb In-Memory-Computing CNN Accelerator Employing Charge-Domain Compute," in IEEE Journal of Solid-State Circuits, vol. 54, No. 6, pp. 1789-1799, Jun. 2019, doi: 10.1109/JSSC.2019.2899730.

Yinqi Tang et al., "Scaling Up In-Memory-Computing Classifiers via Boosted Feature Subsets in Banked Architectures," in IEEE Transactions on Circuits and Systems II: Express Briefs, vol. 66, No. 3, pp. 477-481, Mar. 2019, doi: 10.1109/TCSII.2018.2854759.

Jinato Zhang et al. "A machine-learning classifier implemented in a standard 6T SRAM array," 2016 IEEE Symposium on VLSI Circuits (VLSI-Circuits), Honolulu, HI, 2016, pp. 1-2, doi: 10.1109/VLSIC.2016.7573556.

Jinato Zhang et al. "An In-memory-Computing DNN Achieving 700 TOPS/W and 6 TOPS/mm2 in 130-nm CMOS," In IEEE Journal on Emerging and Selected Topics in Circuits and Systems, vol. 9, No. 2, pp. 358-366, Jun. 2019, doi: 10.1109/JETCAS.2019.2912352.

Akhilesh Jaiswal et al.,"8T SRAM Cell as a Multibit Dot-Product Engine for Beyond Von Neumann Computing," in IEEE Transactions on Very Large Scale Integration (VLSI) Systems, vol. 27, No. 11, pp. 2556-2567, Nov. 2019, doi: 10.1109/TVLSI.2019.2929245.

Jinsu Lee et al., "A 17.5-fJ/bit Energy-Efficient Analog SRAM for Mixed-Signal Processing," in IEEE Transactions on Very Large Scale Integration (VLSI) Systems, vol. 25, No. 10, pp. 2714-2723, Oct. 2017, doi: 10.1109/TVLSI.2017.2664069.

Qing Dong et al., "15.3 A 351TOPS/W and 372.4GOPS Compute-in-Memory SRAM Macro in 7nm FinFET CMOS for Machine-Learning Applications," 2020 IEEE International Solid-State Circuits Conference—(ISSCC), San Francisco, CA, USA 2020, pp. 242-244, doi: 10.1109/ISSCC19947.2020.9062985.

* cited by examiner

HYBRID ACCUMULATION METHOD IN MULTIPLY-ACCUMULATE FOR MACHINE LEARNING

CROSS-REFERENCE TO RELATED PATENT APPLICATIONS

The present application is a continuation-in-part of and claims the benefit of priority from U.S. patent application Ser. No. 16/997,229 filed Aug. 19, 2020. The present application is also a continuation-in-part of and claims the benefit of priority from U.S. patent application Ser. No. 16/925,803 filed Jul. 10, 2020. Moreover, the present application is a continuation-in-part of and claims the benefit of priority from U.S. patent application Ser. No. 17/097,684 filed Nov. 13, 2020. Additionally, the present application is a continuation-in-part of and claims the benefit of priority from U.S. patent application Ser. No. 16/730,446 filed Dec. 30, 2019. Furthermore, the present application is a continuation-in-part of and claims the benefit of priority from U.S. patent application Ser. No. 16/730,539 filed Dec. 30, 2019.

The above-identified applications are hereby incorporated by reference as if fully set forth herein.

FIELD OF DISCLOSURE

The present disclosure relates to improvements in multiply-accumulate operations in machine learning (ML) and artificial intelligence (AI) applications, utilizing one or more of digital, mixed-mode, and analog signal processing in integrated circuits (IC), including in tiny machine learning (TinyML) applications

BACKGROUND

Configurability in matrix multiplication operations is an objective in machine learning circuits and systems, which makes programmable multiply-accumulate (MAC) functions attractive building blocks for systems and software engineers. Digital computation engines are based on advanced and expensive deep sub-micron (bleeding-edge) semiconductor manufacturing that can perform large numbers of complex MAC operations in the cloud with flexibility, programmability, precision, and speed. However, bleeding edge digital MAC engines are generally power hungry and costly. Moreover, and generally speaking, digital MAC engines accessed via the fog or the cloud are potentially less secure (since they are not private for relying on communications through the cloud which may be hacked and or intercepted). Additionally, MAC engines in the fog or the cloud can exhibit latency delays that may be unacceptable for some applications at a network edge, such as medical applications in which a person's life depends on real-time response. Although the flexibility and programmability features of conventional digital MACs make them attractive, their higher power consumption, higher cost, longer latency delays, and lesser safety and lesser privacy can make them prohibitive for some applications near a network edge, at a network edge, and in sensor applications.

Keep in mind that the flexibility of conventional digital MACs comes at a price. For example, having the flexibility of accumulating a wide range of smaller to larger numbers of multiplications would potentially require costlier memory. Integrating for example large amounts of memory (that need not be fast) on the same bleeding-edge chip as fast multipliers in an edge or near sensor MAC application wherein high-speed or dense memory may not be needed, may waste large and expensive silicon die area on slow memory space. Also note that addressing, reading, and writing into and out of memory, especially during high-speed computations, may increase MAC IC power consumption significantly.

While the cost of expensive ICs can be amortized over a longer life cycle of an IC deployed in the cloud (that may not need to be upgraded frequently), the same may not be acceptable for ICs on or near sensors, or at the edge of a network (that may be upgraded and or an updated frequently). Machine learning ICs for or on edge-based sensors generally have a shorter life cycle, and as such they cannot afford to be expensive. Also, on-device or sensor-based machine learning ICs generally target mass markets or consumer applications that are more price sensitive compared to machine learning ICs that are deployed in cloud data centers.

Bear in mind that most real-world signals that are captured by sensors are slow moving and do not require extremely high-speed signal processing, and do not require ICs based on super high-speed and expensive bleeding edge manufacturing.

For distributed intelligence (on sensor or device), low cost and low power may be a significantly more important metric than programmability and speed of computation.

As such, it is highly likely that the current academic/research centered bench-mark metrics (in setting objectives for making edge-based machine learning ICs) may have to shift sooner than later to a more practical set of metrics. For example, priority on highly programmable, low-power, and high-speed ($P^2S$) benchmarking may have to shift and render much greater priority to low-Cost, low-Cost, low-Power, some-Programmability, and low-Speeds ($C^2P_{PS}$) benchmarking in order for edge-based machine learning ICs to take off.

Moreover, sensor based (distributed) intelligence can generally be equipped only with a limited set of know-how and intelligence needed for a limited task within the limited reach of a sensor. As such, distributed intelligence is by design less intrusive and less powerful than central intelligence engines that are designed for the cloud with significantly more power, and having a heightened risk of over-extending the reach of cloud-based computing via its broad-based intelligence, with potentially nonconsensual, unchartered, unregulated, and unintended scope.

As noted, safety and privacy concerns may prohibit some sensors and edge devices from delegating their machine learning tasks to the cloud. Imagine if a hacker were to intercept sensitive information and data of a heart pace-maker, hearing aid, or residence digital electronics (e.g., smart door opener, smart fireplace control, smart home surveillance video, etc.) that is required to communicate with the cloud for it to operate properly. Machine learning computation tasks at the edge of a network, or on or near sensors, must perform their machine learning computations locally and not in the cloud for safety, latency, and low-cost considerations. Because of shorter life cycles of edge-based devices that may target cost sensitive consumer or large volume mass markets, the price cannot be expensive. This precludes fabricating computational ICs having short life cycles on advanced deep-submicron manufacturing where the tooling and wafer costs are very high.

Moreover, we are near or at the end of Moore's Law, which means going forward, the semiconductor industry and ICs cannot bank on chip costs to, for example, depreciate twice every 18-months as it has been doing for the last few decades. In other words, companies may no longer risk investing today in future mass markets by utilizing today's expensive digital machine learning ICs because the cost of that technology may not decline much.

Accordingly, machine learning ICs offering low cost, low current consumption, low voltage power requirements, options of asynchronous operations, having safe and private (near or on device and sensor) communication features, and further having flexibility and programmability, are needed. Such advantages are needed for smart devices and smart sensors to become free from the bounds of the cloud (based machine learning), free from the bounds of wire, free from frequent battery recharges, and free from some cloud-based remote intelligence utilizing public networks that can be hacked, corrupted, or disabled.

SUMMARY OF THE INVENTION

It is an objective of the present disclosure to provide improvements to ICs utilizing MACs for machine learning on sensors or devices including without limitation the following, in part or in combination thereof:

An objective of this disclosure is to provide MAC ICs with some programmability and flexibility, wherein a fixed bank of parallel MAC operations (i.e., spatial) can be followed by a time multiplexed (programmable) series of accumulations (i.e., temporal).

Another objective of this disclosure is to optimize cost-performance of a MAC for activation and weight signals whose population and or combinations follow a predictable statistical distribution profile (e.g., Gaussian distribution with an average and a sigma).

Accumulating a plurality of multiplication products in conventional MAC ICs could require large size accumulators whose outputs would otherwise overflow as more signals add-up in the accumulator. Generally, digital accumulators become large if they are required to accumulate large numbers of digital signals. Also, generally, outputs of analog accumulators run out of headroom (considering limited power supplies available voltage) if they are required to accumulate many analog signals.

Therefore, another objective of this disclosure is to provide MAC ICs that are less constrained by digital or analog signal overflow constraints, or power supply headroom limitations.

Furthermore, another objective of this disclosure is to transform the accumulating signal in a MAC IC into a hybrid signal (e.g., one that comprises a Most Significant Portion and a Least Significant Portion), to facilitate widening the span of the accumulating signal without either breaching, e.g., a $V_{DD}$ and or $V_{SS}$ operating headroom or causing overflow and or underflow conditions.

Errors in conventional analog accumulators are generally cumulative. Another objective of this disclosure is to provide mixed-signal accumulators whose cumulative errors are substantially reduced.

Another objective of this disclosure is to provide MAC ICs that can perform accumulation functions in analog, or mixed-mode, or both, so that memory or register functions that store the intermediate or partial digital summations are avoided and or are reduced in size, with the further objective to save digital memory area and reduce dynamic power consumption associated with read-write cycles into and out of memory.

Another objective of this disclosure is to communicate only a portion of an accumulated signal such as the Least-Significant-Portion (LSP) signal (to subsequent layers) that is pertinent to the machine learning operation of the edge-based device in the field (e.g., finding minimum-cost function). In such an example, given that the LSP signal would inherently represent a smaller portion of the objective final accumulated signal, the storage of such LSP signal (analog or digital) would be smaller, cheaper, and faster to access while consuming lower dynamic current which can reduce power consumption.

Another objective of this disclosure is to provide edge-based MACs ICs that are free from relying on a communications network and release them from depending on computation engines in the cloud, thereby making such edge-based MAC ICs safer, more private, more operable independently, and less subject to latency delays, as a trade-off for less signal processing features at slower speeds, less capacity, and less programmability.

Another objective of this disclosure is to provide MAC ICs that can be fabricated on low-cost, trailing-edge manufacturing, and not requiring expensive bleeding-edge fabrication.

Another objective of this disclosure is to provide MAC ICs that can operate with low power supply voltages ($V_{SS}$ and $V_{DD}$).

Another objective of this disclosure is to provide MAC ICs that can be arranged with in-memory-compute (IMC) having low dynamic power consumption resulting from read-write cycles into and out of memory.

Another objective of this disclosure is to provide MAC ICs that have ultra-low off leakage current to help with substantially minimizing stand-by operating current.

Another objective of this disclosure is to provide MAC ICs with the option of operating asynchronously and free from a system clock, which minimizes latency delay and reduces free-clock related power consumption.

Another objective of this disclosure is to provide MAC ICs that are mixed signal and or analog current mode wherein the internal full-scale to zero-scale current signal span (e.g., at a summing node of a MAC or at analog input of an Analog-To-Digital-Converter or at analog input of a comparator or an analog input of an analog accumulator) is less restricted by $V_{DD}$.

Another objective of this disclosure is to provide MAC ICs that are process node portable wherein they can be manufacturable on readily available fabrication facilities, have multi-source manufacturing, and are based on mainstream Complementary-Metal-Oxide-Semiconductor (CMOS) fabrication processes.

Another objective of this disclosure is to provide MAC ICs with the option of not requiring passive resistors or additional capacitors (that would otherwise require extra masks and manufacturing steps), thereby resulting in MAC performance that is mostly independent of passive resistors or capacitors, and with lower costs and improved manufacturing yield.

Another objective of the present disclosure is to enable "always-on" operation wherein a meaningful portion of the computation circuitry shuts itself off (i.e., 'smart self-power-down') in the face of no incoming signal so that the remaining computation circuits can remain 'always on' while consuming very low stand-by current.

Another objective of the present disclosure is to desensitize overall performance of MAC ICs, including their operating currents, bias currents, reference currents, summing currents, and output currents, from power supply variations.

Another objective of the present disclosure is to desensitize the overall performance of MAC ICs from temperature variations.

Another objective of the present disclosure is to lower the sensitivity of the overall performance of MAC ICs, including their operating currents, bias currents, and reference currents, from normal manufacturing variations (e.g., normal threshold voltage variations of transistor), which could improve the silicon die yield and lower the IC cost.

Another objective of this disclosure is to provide MAC ICs with the option of operating in current mode.

Another objective of this disclosure is to provide MAC ICs with the option of operating in current mode where signal swings are small and thus signal processing can be inherently fast.

Another objective of this disclosure is to provide MAC ICs wherein the summation and subtraction functions of the MAC can be performed in analog or mixed mode (e.g., current-mode, voltage mode with switch capacitor networks, or both).

Another objective of this disclosure is to provide MAC ICs with the option that digital XOR/XNOR functions can be performed with mixed mode signals (current-mode, voltage mode, or both), asynchronously or synchronously.

Another objective of this disclosure is to provide MAC ICs that can perform the accumulation functions in analog, mixed-mode, or both, so that digital adders (which occupy larger die area) are avoided.

Another objective of this disclosure is to provide MAC ICs for Binary Neural Networks (BNNs) having improved linearity wherein non-linearity due to non-systematic random statistical contributions of mismatches between equally sized current signals (or equally sized capacitors) would inherently be accumulated by the square root of the sum of the squares of such non-systematic random mismatches attributed to the plurality of summing current signals or a plurality of voltage signals.

Another objective of this disclosure is to provide MAC ICs having mixed-mode, analog, or both, for BNNs that perform a bitwise population count function via mixed-signal, analog-signal, or both, while exhibiting monotonic incremental accumulation of equally sized current or charge/voltage signals stored on equally sized capacitors.

An aspect of the embodiments disclosed herein include a method of performing a multiply-accumulate operation variation [TO BE ADDED FROM THE CLAIM SECTION].

BRIEF DESCRIPTION OF THE DRAWINGS

The subject matter presented herein is illustrated by way of example, and not by way of limitation, in the figures of the accompanying drawings and illustrations, and in which like reference numerals, without regard to whether a reference numeral is written with upper or lower case letters, e.g., $ADD_{1A}$ and $ADD_{1A}$, refer to similar elements, and in which:

FIG. 7A models an analog, mixed-mode, or both, voltage-input to voltage-output sampling system wherein Vo(z) represents the LSP of the signal that is being accumulated. Moreover, each time during the accumulation (temporal or serial) span if the Vo(z) value exceeds a programmed signal level (V$_{REF}$), then an event count is initiated and registered to keep track of the MSP of the signal that is being accumulated.

SUMMARY OF THE DISCLOSURE

Figure 1A:
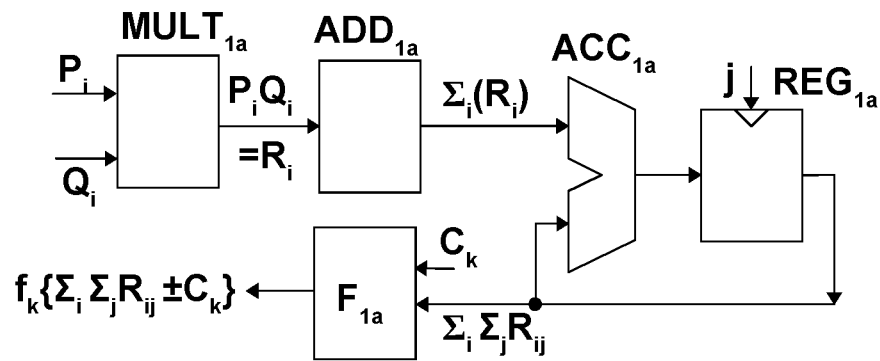
FIG. 1A illustrates a spatial-temporal MAC method, depicted by a simplified IC block diagram of an embodiment illustrating a parallel (spatial) bank of MAC ($MULT_{1A}$+$ADD_{1A}$) circuit block whose output communicates with a programmable serial (temporal) accumulator ($ACC_{1A}$+$REG_{1A}$) circuit block, wherein the output of the $ACC_{1A}$+$REG_{1A}$ communicates with a programmable activation ($F_{1A}$) circuit block. The block diagram of FIG. 1A illustrates N copies of $MULT_{1A}$+$ADD_{1A}$ circuit block (e.g., $1<i<N$) and one copy of $ACC_{1A}$+$REG_{1A}$ circuit block. The $ACC_{1A}$+$REG_{1A}$ can be programmed to be clocked serially M times (e.g., $1<j<M$), during which a plurality of $\Sigma R_i$ results are accumulated to generate $\Sigma R_{ij}$.

An aspect of the present disclosure is a method of performing a spatial-temporal multiply-accumulate (MAC) operation in an integrated circuit, the method comprising: multiplying simultaneously a first plurality of digital signal pairs, each digital signal pair comprising a digital weight (P$_I$) signal and a digital activation (Q$_I$) signal, to generate a first plurality of analog signal pair product (P$_{I1}$.Q$_{I1}$) signals; summing simultaneously the P$_{I1}$.Q$_{I1}$ signals to generate a first analog summation (ΣP$_{I1}$.Q$_{I1}$) signal; multiplying simultaneously a subsequent plurality of digital signal pairs, each subsequent digital signal pair comprising a digital weight (P$_{IJ}$) signal and a digital activation (Q$_{IJ}$) signal, to generate a subsequent plurality of pairs of analog products (P$_{IJ}$.Q$_{IJ}$) signals; and storing and accumulating serially the P$_{IJ}$. Q$_{IJ}$ signals with the ΣP$_{IJ}$.Q$_{IJ}$ signal to serially generate a multiply-accumulate (ΣΣP$_{IJ}$.Q$_{IJ}$) signal. Another aspect of the present disclosure is the method of performing a spatial-temporal multiply-accumulate (MAC) operation in an integrated circuit, the method further comprising: processing at least one of the P$_{I1}$.Q$_{I1}$ signals, the ΣP$_{I1}$.Q$_{I1}$ signal, and the ΣΣP$_{I1}$.Q$_{I1}$ signal differentially. Another aspect of the present disclosure is the method of performing a spatial-temporal multiply-accumulate (MAC) operation in an integrated circuit, the method further comprising: processing at least one of the P$_{I1}$.Q$_{I1}$ signals, the ΣP$_{I1}$.Q$_{I1}$ signal, and the ΣΣP$_{IJ}$.Q$_{IJ}$ signal in at least one of the analog domain and the digital domain. Another aspect of the present disclosure is the method of performing a spatial-temporal multiply-accumulate (MAC) operation in an integrated circuit, the method further comprising: generating at least one of the P$_{IJ}$.Q$_{IJ}$ signals in a binary neural network (BNN). Another aspect of the present disclosure is the method of performing a spatial-temporal multiply-accumulate (MAC) operation in an integrated circuit, the method further comprising: subtracting a running average (Ṙi/J) signal from at least one of the ΣΣP$_{IJ}$.Q$_{IJ}$ signal and the ΣP$_{I1}$.Q$_{I1}$ signal. Another aspect of the present disclosure is the method of performing a spatial-temporal multiply-accumulate (MAC) operation in an integrated circuit, the method further comprising: combining the ΣΣP$_{IJ}$.Q$_{IJ}$ signal with an offset (C$_K$) signal to generate an activation (F$_K${ΣΣP$_{IJ}$.Q$_{IJ}$±C$_K$}) signal.

An aspect of the present disclosure is a method of performing a Programmable Hybrid Accumulation (PHA) operation in an integrated circuit, the method comprising: multiplying simultaneously a first plurality of digital signal pairs, each digital signal pair comprising a digital weight (P$_I$) signal and a digital activation (Q$_I$) signal, to generate a first plurality of analog signal pair product (P$_{I1}$.Q$_{I1}$) signals; summing simultaneously the P$_{I1}$.Q$_{I1}$ signals to generate a first analog summation (ΣP$_{I1}$.Q$_{I1}$) signal; multiplying simultaneously a subsequent plurality of digital signal pairs, each subsequent digital signal pair comprising a digital weight (P$_{IJ}$) signal and a digital activation (Q$_{IJ}$) signal, to generate a subsequent plurality of pairs of analog products (P$_{IJ}$.Q$_{IJ}$)

signals; storing and accumulating serially the $P_{IJ}.Q_{IJ}$ signals with the $\Sigma P_{IJ}.Q_{IJ}$ signal to serially generate a multiply-accumulate ($\Sigma\Sigma P_{IJ}.Q_{IJ}$) signal; and generating a Least-Significant-Portion (LSP) of the $\Sigma\Sigma P_{IJ}.Q_{IJ}$ signal by subtracting at least one mod signal (P) from the $\Sigma\Sigma P_{IJ}.Q_{IJ}$ signal when $\Sigma\Sigma P_{IJ}.Q_{IJ} > P$ is detected, and keeping track of such a detection in an event counter to generate the Most-Significant-Portion of the $\Sigma\Sigma P_{IJ}.Q_{IJ}$ signal.

Another aspect of the present disclosure is the method of performing a Programmable Hybrid Accumulation (PHA) operation in an integrated circuit, the method further comprising: processing at least one of the $P_{f1}.Q_{f1}$ signals, the $\Sigma P_{f1}.Q_{f1}$ signal, and the $\Sigma\Sigma P_{IJ}.Q_{IJ}$ signal in at least one of the analog domain and the digital domain. Another aspect of the present disclosure is the method of performing a Programmable Hybrid Accumulation (PHA) operation in an integrated circuit, the method further comprising: processing at least one of the $P_{f1}.Q_{f1}$ signals, the $\Sigma P_{f1}.Q_{f1}$ signal, and the $\Sigma\Sigma P_{IJ}.Q_{IJ}$ signal differentially.

Another aspect of the present disclosure is the method of performing a Programmable Hybrid Accumulation (PHA) operation in an integrated circuit, the method further comprising: processing at least one of the $P_{f1}.Q_{f1}$ signals, the $\Sigma P_{f1}.Q_{f1}$ signal, and the $\Sigma\Sigma P_{IJ}.Q_{IJ}$ signal in at least one of (i) switched capacitor voltage mode and (ii) switched current mode.

DETAILED DESCRIPTION

Numerous embodiments are described in the present application and are presented for illustrative purposes only and are not intended to be exhaustive. The embodiments were chosen and described to explain principles of operation and their practical applications. The present disclosure is not a literal description of all embodiments of the disclosure(s). The described embodiments are also not limiting in any sense. One of ordinary skill in the art will recognize that the disclosed embodiment(s) may be practiced with various modifications and alterations, such as structural, logical, and electrical modifications. For example, the present disclosure is not a listing of features which must necessarily be present in all embodiments. On the contrary, a variety of components are described to illustrate a wide variety of possible embodiments of the present disclosure(s). Although features of the disclosed embodiments may be described with reference to one or more particular embodiments or drawings, it should be understood that such features are not limited to usage in any one or more particular embodiments or drawings with reference to which they are described, unless expressly specified otherwise. The scope of any inventions is defined by the claims.

Although process (or method) steps may be described or claimed in a particular sequential order, such processes may be configured to work in different orders. In other words, any sequence or order of steps that may be explicitly described or claimed do not necessarily indicate a requirement that the steps be performed in that order. The steps of processes described herein may be performed in any order possible. Further, some steps may be performed simultaneously despite being described or implied as occurring non-simultaneously (e.g., because one step is described after another step). Moreover, the illustration of a process by its depiction in a drawing does not imply that the illustrated process is exclusive of other variations and modifications thereto and does not imply that the illustrated process or any of its steps are necessary to the embodiment(s). In addition, although a process may be described as including a plurality of steps, that does not imply that all or any of the steps are essential or required. Various other embodiments within the scope of the described disclosure(s) include other processes that omit some or all the described steps. In addition, although a circuit may be described as including a plurality of components, aspects, steps, qualities, characteristics or features, that does not indicate that any or all the plurality are essential or required. Various other embodiments may include other circuit elements or limitations that omit some or all the described plurality. In U.S. applications, only those claims specifically citing "means for" or "step for" should be construed in the manner required under 35 U.S.C. § 112(f).

Throughout this disclosure, the following nomenclatures or abbreviations may be utilized: the term FET is field-effect-transistor; MOS is metal-oxide-semiconductor; MOSFET is MOS FET; PMOS is p-channel MOS; NMOS is n-channel MOS; BiCMOS is bipolar and MOS on the same chip; SPICE is a Simulation Program with Integrated Circuit Emphasis which is an industry standard circuit simulation program; micro is $\mu$ which is $10^{-6}$; nano is n which is $10^{-9}$; and pico is p which is $10^{-12}$. Bear in mind that $V_{DD}$ (as a positive power supply) and $V_{SS}$ (as a negative power supply) may be applied to circuitries, block, or systems in this disclosure, but may not be shown for clarity of illustrations. The $V_{SS}$ may be connected to a negative power supply or to ground (zero) potential. The body terminal of MOSFETs can be connected to their respective source terminals or to the MOSFET's respective power supplies, $V_{DD}$ and $V_{SS}$.

Most-Significant-Bit is MSB, Least-Significant-Bit is LSB. For example, for $S_{REF}=1V$ processed in a 7-bit system having $2^7$ increments compute to 128 increments, and thus each LSB is $1V/128 \sim 7.8$ mV. Most-Significant-Portion is MSP, and Least-Significant-Pit is LSP, wherein the Portions in MSP and LSP can be programmed in accordance with the cost-performance objectives of an end-application.

Compute-In-Memory is CIM. Binary Neural Network in BNN, Artificial Neural Network is ANN, Multiply-Accumulate is MAC, Multiply-Add is MAD, Accumulator is ACC, Modulo Operator is MOD, Programmable-hybrid-accumulator is PHA, Sample and Hold is SH, Analog-to-Digital Converter is ADC, Digital-to-Analog Converter is DAC, Logical Exclusive OR is XOR, Logical Exclusive NOR is XNOR, Static Random Access memory is SRAM, Dynamic Random Access Memory is DRAM, Erasable Programmable Read-Only Memory is an EPROM, Electrical EPROM is EPROM, or Multiplexor is MUX, Comparator is CMP, Amplifier is AMP, Switch is SW, Capacitor is C, Resistor is R, Reference Signal is $S_R$ or $S_{REF}$, Clock is CLK, Reference Current is $I_R$ or $I_{REF}$, Reference Voltage is $V_R$ or $V_{REF}$, event counter is EC or ec, Average of $R_i$ is $\hat{R}_I$ (sometimes also referred to as $\mu$), standard deviation is sigma ($\sigma$) of a probability distribution function, and activation function may be a sigmoid or a sign function (SIG) or Rectified Linear Unit function (ReLu) or their variations or other activation functions, $\Sigma$ denotes summation or addition, $$\sum_{i}^{n} R_i$$

is parallel or spatial summation of n of multiplications of $P_i$ by $Q_i$ that produce $R_i=P_i \times Q_i$, and time-multiplexed or serial (temporal) summation of m of $$\sum_{i}^{n} R_i$$

is $$\sum_{j}^{m}\sum_{i}^{n} R_{ij},$$

wherein i spans from 1 to n, and j spans from 1 to m.

Keep in mind that for descriptive clarity, illustrations of this disclosure may be simplified, and their improvements beyond simple illustrations would be obvious to one skilled in the art. For example, it would be obvious for one skilled in the art that MOSFET current sources can be cascoded for higher output impedance and lower sensitivity to power supply variations, whereas throughout this disclosure current sources may be depicted with a single MOSFET for clarity of illustration. It would also be obvious to one skilled in the art that a circuit schematic illustrated in this disclosure may be arranged with NMOS transistors or arranged in a complementary version utilizing transistors such as PMOS.

The illustrated circuit schematics of embodiments described in the proceeding sections may have the following benefits, some of which are outlined here to avoid repetition in each section in the interest of clarity and brevity:

First, a temporal-spatial MAC method described in this disclosure can provide some programmability in the number of MAC operations, for example by arranging a fixed bank of 16-channel parallel MAC operations that communicate with an accumulator that is time multiplexed. In an application that requires 250 MAC operations, such temporal-spatial MAC IC can be clocked (program time-multiplexed) 16 times sequentially (16×16) which provides a total of 256 MAC operations to cover the objective minimum of 250 MAC operations (requiring the 6 excess multiplications to be suppressed in some manner). In another example, when 40 MAC operations are needed for another application, a temporal-spatial MAC IC can be clocked 3 times sequentially (16×3) which provides total of 48 MAC operations to cover the objective minimum of 40 MAC operations (similarly requiring the 8 excess multiplications to be suppressed in some manner).

Second, accumulating multiplied signals can overflow a register in a digital adder, or cause analog outputs to breach a power supply $V_{DD}$ operating headroom. To overcome an overflow of MAC signals at the output of an accumulator, a programmable-hybrid-accumulator (PHA) method is disclosed. The PHA method described in this disclosure can keep the output of an accumulator within a programmed range (to avoid overflow, underflow, or breaching the operating power supply $V_{DD}$ and or $V_{SS}$ limits) without substantially hindering the precision of the accumulator. A PHA circuit can monitor the output value of the accumulator and subtract a reference signal ($S_{REF}$) value or finer set of $S_{REF}$ increments or a signal or set of signals proportional to $S_{REF}$ from the input of the accumulator, when for example an output of the accumulator exceeds a value proportional to $S_{REF}$. Also, another embodiment of the PHA circuit can vary the gain of the accumulator each time the output of the accumulator exceeds such limits as apportioned by a P value or a finer set of P incremental values. As a plurality of product signals are accumulated, and each time the output of the accumulator breaches its programmed limits, a signal (e.g., event counter) can be generated to represent a Most-Significant-Portion (MSP) of the final value of the accumulator signal value. Also, as a plurality of product signals are accumulated, in concert with the MSP, a residual Least-Significant-Portions (LSP) signal can be generated representing the LSP of the signal for the final value of the accumulator output signal. In summary, by effectively transforming an objective accumulating signal of a MAC IC into a HYBRID SIGNAL (comprising an MSP signal and an LSP signal), the span of the accumulating signal can widen without either breaching the $V_{DD}$ and or $V_{SS}$ operating headroom or causing over-flow and or over-flow conditions.

Third, in end-applications where an activation function such as a magnitude comparator receives a LSP signal (sufficient in scale to compute a minimum cost function), a smaller size of the LSP signal goes together with for example a smaller magnitude comparator which can save on silicon die area and convergence speed.

Fourth, for a given operating current, a PHA method enables limiting peak-to-peak signal output swing of a mixed-mode accumulator (representing the accumulator's LSP signal) which can make it faster given that smaller peak-to-peak analog and or mixed-signal swings slew and or settle faster compared to ones with wider swings.

Fifth, because a PHA method enables limiting peak-to-peak current signal output swing of a mixed-signal current-mode accumulator (representing the accumulator's LSP signal), the power consumption can be lowered given the bounded current-swings internal to the accumulator.

Sixth, also because a PHA method enables limiting peak-to-peak signal output swing of a mixed-signal accumulator, static and dynamic signal dependent current draw from power supplies (e.g., $V_{DD}$ and $V_{SS}$ and Ground) can be more bounded and stable, which could help relax power supply design considerations surrounding the accumulator.

Seventh, moreover because a PHA method enables limiting peak-to-peak signal output swing of a mixed-signal accumulator, charge-pumps or multiple power supplies can be avoided which would otherwise be needed to power on-and-off the internal switch capacitors that must remain in compliance with larger peak-to-peak signal swings during an accumulation cycle.

Eighth, for the embodiment in which a significant portion of product signal accumulation is processed in analog and stored in analog memory, the need for digital memory and its associated read-write cycles are eliminated, which can materially lower dynamic power consumption associated with read-write cycles into and out of digital memory.

Ninth, because a PHA method enables the bounding of analog and mixed-signal peak-to-peak swings, power consumption and speed can be improved. For example, for a current-mode PHA circuit (arranged based on a PHA method) in which peak-to-peak output current spans are limited, the current consumption of such PHA circuit can be bounded as well as be nearly independent of the number of current signals that are to be accumulated. For a voltage-mode PHA circuit in which peak-to-peak output voltage swings are bounded, the speeds (i.e., slew rate and settling time) of such PHA circuit for a given current consumption, can be optimized for higher speeds and lower power consumption. Moreover, distortions attributed to wide peak-to-peak signal swing can be minimized considering the bounded output span of a PHA circuit. Moreover, peak-topeak signal swing-dependent charge injections may also be reduced in a PHA circuit (voltage or current mode) given the bounded magnitude of accumulated signals at the output of the mod-hybrid-accumulator.

Tenth, because voltage swings are small in current mode signal processing, the disclosed mixed-signal current-mode circuit designs can enable high speed signal processing. Moreover, because current mode signal processing can be made fast, the disclosed mixed-signal current-mode circuit designs can provide a choice of trade-off and flexibility between running at moderate speeds and operating with low currents to save on power consumption.

Eleventh, the disclosed mixed-signal current-mode and switch-capacitor voltage-mode or charge-transfer-mode circuit designs can be arranged on a silicon die near memory to facilitate Compute-In-Memory (CIM) operation. Such an arrangement reduces the read/write cycles into and out of memory and thus lowers overall dynamic power consumption.

Twelfth, performance of some of the disclosed mixed-signal current-mode circuit embodiments can be arranged to be independent of resistors and capacitor values and their normal variations in manufacturing. As such, manufacturing die yield can perform to specifications mostly independent of passive resistor or capacitor values and their respective manufacturing variations, which could otherwise reduce die yield and increase cost.

Thirteenth, because voltage swings are small in current mode signal processing, the disclosed mixed-signal current-mode circuit designs can operate with low power supply voltage.

Fourteenth, also because voltage swings are small in current mode signal processing, the disclosed mixed-signal current-mode circuit embodiments can enable internal analog signals to span between full-scale and zero-scale (e.g., a summing node of a MAC or analog input of an Analog-To-Digital-Converter or analog input of a comparator) which enables a full-scale dynamic range that is less restrictive of power supply voltage $V_{DD}$ levels.

Fifteenth, the disclosed mixed-signal voltage-mode or current-mode circuit designs can be manufactured on low-cost standard and conventional Complementary-Metal-Oxide-Semiconductor (CMOS) fabrication, which are more mature, readily available, and process node portable than "bleeding-edge" technologies, thereby facilitating embodiments of ICs having relatively more rugged reliability, multi-source manufacturing flexibility, and lower manufacturing cost.

Sixteenth, digital addition and digital subtraction can occupy a larger die area than similar analog operations. Because the disclosed circuit embodiments can operate in current mode, the function of addition in current mode simply requires the coupling of output current ports. For arrangements of the disclosed circuit embodiments that can operate in switched capacitor voltage-mode, the function of addition simply requires the coupling of capacitors that carry the intended charges or voltages. Thus, the disclosed embodiments can be arranged in smaller die areas and cost less.

Seventeenth, multiplications or XOR/XNOR functions can be performed in mixed signals which can save area and reduce costs.

Eighteenth, as noted earlier, digital addition and subtraction functions occupy large die areas and can be expensive. Some embodiments in the present disclosure eliminate the digital adding function of bitwise count of logic state '1' required in BNNs by performing the population counting of states of '1's in analog, mixed-mode, or both. Coupling together equally sized current sources or equally sized (equally charged) capacitors can potentially perform the bitwise count in mixed-mode, analog, or both more effectively, thereby taking less area, consuming less power, and costing less.

Nineteenth, some of the disclosed mixed-signal current-mode circuit embodiments utilized in BNNs can help reduce inaccuracies attributed to the function of addition that stems from random but normal manufacturing variations (e.g., random transistor mismatches in normal fabrication). In the disclosed mixed-signal circuit embodiments wherein equally sized current-sources or equally sized capacitors are utilized, any non-linearity due to the non-systematic random statistical contribution of mismatches (of adding or deducting an incremental current or a voltage/charge stored on equally sized capacitors) roughly equals the square root of the sum of the squares of such non-systematic random mismatches. The benefit of this attenuated impact of imperfections due to random manufacturing variations attributed to equally sized current sources or equally sized capacitors on overall accuracy, is an inherent advantage of some of the disclosed embodiments which can improve manufacturing yield to specifications that is passed on to the BNNs.

Twentieth, cascoding current sources can help increase output impedance and reduce sensitivity of output currents to power supply variations but require two cascoded transistors. Some of the disclosures herein can utilize power supply desensitization circuits for a current source that is not cascoded (e.g., single MOSFET current source).

Twenty-first, for some of the disclosures herein, because each unit of cumulative current or voltage signals (that represents the bitwise count of logic state '1' as an analog current through equally sized current sources or as an equally sized charge or voltage stored on equally sized capacitors), the incremental summation of a plurality of output current or voltage signals is thermometer-like. Accordingly, the disclosed mixed-signal current-mode or switch capacitor voltage-mode or charge-mode circuit embodiments provide monotonic incremental accumulation of adding current or voltage or charge signals which is beneficial for convergence on minimum cost function during training cycles of machine learning ICs.

Twenty-second, some of the disclosed mixed-signal current-mode or switch-capacitor voltage-mode or charge-mode circuit embodiments utilized here have the option of enabling a meaningful portion of the computation circuitry to shut itself off (i.e., 'smart self-power-down') in the face of no incoming signal so that the remaining computation circuits can remain 'always on' while consuming low stand-by current consumption.

Twenty-third, the disclosed MAC IC embodiments may be optimized for cost-performance with a smaller size accumulator and activation function circuit for kinds of incoming signals in which the signal population follows a predictable statistical distribution profile (e.g., Gaussian distribution with an average and a sigma).

Twenty-fourth, utilizing a PHA method in a MAC IC facilitates having an option of communicating only a portion of an accumulated signal such as an LSP signal (to subsequent layers) that is pertinent to the machine learning operation of the edge-based device in the field (e.g., finding minimum-cost function). Given that an LSP signal would inherently represent a smaller portion of the objective final accumulated signal, the storage of such LSP signal (analog or digital) would be smaller, cheaper, and faster to access with lower dynamic power consumption. Bear in mind that a large part of power consumption of MAC ICs is due to read-and-write cycles in-an-out of memory. The disclosed MAC IC embodiments provide additional solutions, besides compute-in-memory (CIM), that transform the final accumulating signals and represent them as hybrid signals, and could enable applications to process, store, read, and write only pertinent and SMALLER/PARTIAL segments of such hybrid (final accumulating) signals which could provide substantial savings in dynamic power consumption.

Twenty fifth, mixed-signal accumulators whose cumulative errors are substantially reduced by for example, performing part of the accumulation in analog mode and part of the accumulation in digital mode.

Section 1A—Description of FIG. 1A

FIG. 1A illustrates a spatial-temporal MAC method that is depicted in a simplified circuit block of an embodiment illustrating a (spatial) bank of parallel plural MAC ($MULT_{1A}+ADD_{1A}$) circuit block whose output communicates with a (temporal) programmable time-multiplexed accumulator ($ACC_{1A}+REG_{1A}$) circuit block, wherein the output of the $ACC_{1A}+REG_{1A}$ communicates with a programmable activation function ($F_{1A}$).

A plurality of n pairs of input signals $P_i$ and $Q_i$ are multiplied spatially (e.g., in parallel) via $MULT_{1A}$ circuit block whose plurality of outputs $P_i \times Q_i = R_i$ signals are added via the $ADD_{1A}$ circuit block to generate a spatial partial summation $$\sum_{i=1}^{n} R_i$$

signal. Then, a temporal (e.g., serial) accumulation of $$\sum_{i=1}^{n} R_i$$

signals via a $ACC_{1A}+REG_{1A}$ circuit block generates a final summation in m sequences (e.g., in series/time-multiplexed) wherein the final summation is $$\sum_{j=1}^{m}\sum_{i=1}^{n} R_{ij}.$$

An activation function ($F_{1A}$) receives the $$\sum_{j=1}^{m}\sum_{i=1}^{n} R_{ij}$$

signal, and a programmed offset signal ($C_K$) generates an activation signal, $$f_K \left\{ \sum_{j=1}^{m}\sum_{i=1}^{n} R_{ij} \pm C_K \right\}.$$

Note, the sign of $C_K$ must be either + or − depending on training algorithms and the objectives of an end-application.

The $MULT_{1A}$, $ADD_{1A}$, $ACC_{1A}$, $REG_{1A}$, and $F_{1A}$ circuit blocks and the signals traversing through them can be digital, analog, or mixed-mode, or a combination thereof, and the said signals may be arranged differentially or in a single-ended fashion, depending on cost-performance requirements of a target application. For example, the $MULT_{1A}$, and $ADD_{1A}$ circuit blocks can be arranged in differential mixed-signal current-mode, while $ACC_{1A}$, and $REG_{1A}$ can be arranged in switching current-mode differentially (mixed-signal sampling), and the $F_{1A}$ can be arranged as a differential analog comparator to perform a sign or sigmoid function.

One of the benefits of the temporal-spatial MAC arrangement is that m can be programmed for the temporal accumulator (comprising $ACC_{1A}$ and $REG_{1A}$) to be clocked by j for up to m times depending on the application requirements.

Keep in mind that some of the benefits summarized in the earlier section titled DETAILED DESCRIPTION are applicable here.

Figure 1B:
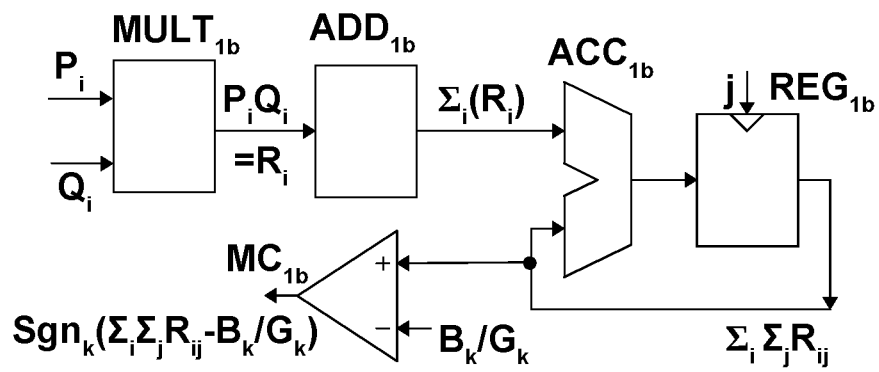
FIG. 1B is another simplified illustration of an embodiment of FIG. 1A wherein the programmable activation function is a sign circuit that roughly approximates a sigmoid function, wherein the $\Sigma R_{ij}$ signal is compared with a $B_K/G_K$ signal, wherein $B_K$ can denote a bias signal and $G_K$ can denote a gain signal for normalization.

Section 1B—Description of FIG. 1b

FIG. 1B is another simplified embodiment of FIG. 1A wherein the programmable activation function is a sign circuit that performs a sigmoid function, for example.

Here, a comparator ($MC_{1B}$) compares the value of the final accumulated signal $$\sum_{j=1}^{m}\sum_{i=1}^{n} R_{ij}$$

to an offset signal ($B_K$) divided by a normalization gain factor ($G_K$), wherein the normalized offset signal ($B_K/G_K$) can be compiled and/or programmed.

Also, note that some of the benefits summarized in section 1A and the earlier section titled DETAILED DESCRIPTION are applicable here.

Figure 1C:
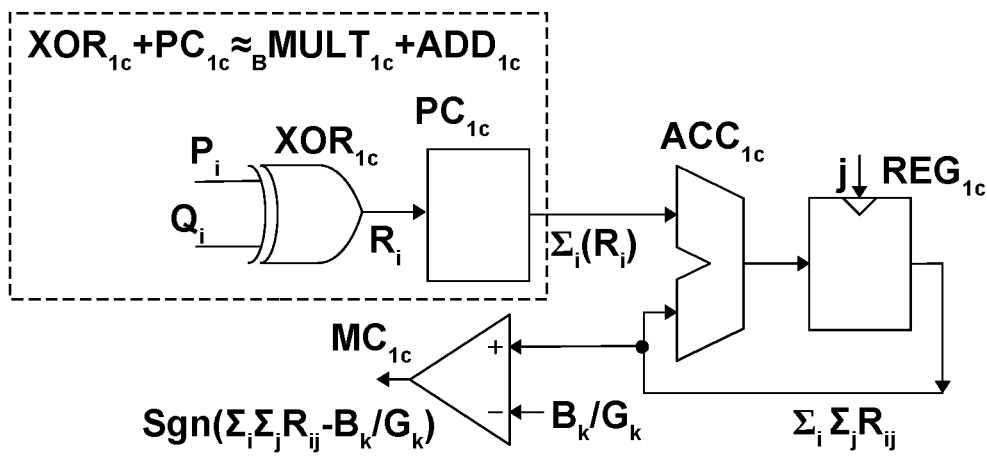
FIG. 1C is another simplified illustration of an embodiment of FIG. 1B arranged in a Binary Neural Network (BNN), wherein a dotted-line $BMULT_{1C}$+$ADD_{1C}$ block is comprised of a plurality of parallel XOR/XNOR ($XOR_{1C}$) logic circuits communicating with a population counter ($PC_{1C}$) circuit.

Section 1C—Description of FIG. 1c

FIG. 1C is another simplified embodiment of FIG. 1B arranged in a Binary Neural Network (BNN) wherein the dash-enclosed $BMULT_{1C}+ADD_{1C}$ circuit block is comprised of a bank of parallel plurality of XOR/XNOR ($XOR_{1C}$) logic circuits communicating with a population counter ($PC_{1C}$) circuit.

Bear in mind that some of the benefits summarized in section 1B and the earlier section titled DETAILED DESCRIPTION are applicable here.

Figure 2A:
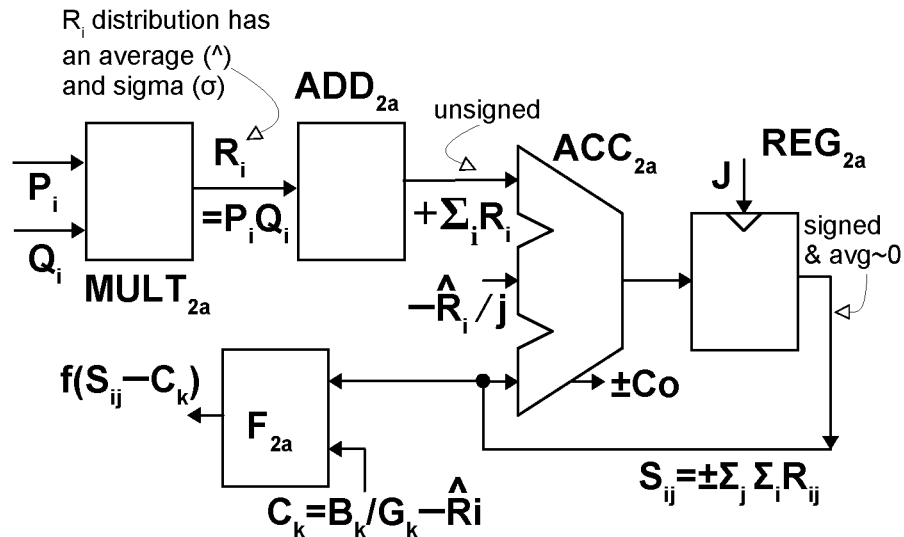
FIG. 2A is another simplified illustration of an embodiment of FIG. 1A in which an $ACC_{2A}$+$REG_{2A}$ circuit block can be programmed such that the profile of the output of the $ACC_{2A}$+$REG_{2A}$ circuit block is signed with an average value around zero scale, and wherein the output signal values of the $MULT_{2A}$ circuit block ($R_i$=$P_i \times Q_i$) follows a distribution with an average ($\hat{R}_j$) and a sigma ($\sigma$). To keep the output of the $ACC_{2A}$ (serial) accumulator centered and to avoid overflow conditions, a third input of $ACC_{2A}$ is provided with $-\hat{R}_j/j$, wherein j is the number of times $REG_{2A}$ is programmed to be clocked.

Section 2A—Description of FIG. 2A

FIG. 2A is another embodiment of FIG. 1A in which an $ACC_{2A}+REG_{2A}$ circuit block can be programmed such that the profile of the output of the $ACC_{2A}+REG_{2A}$ circuit block is signed with an average value around zero scale, and wherein the output signal values of the $MULT_{2A}$ circuit block ($R_i=P_i \times Q_i$) follow a distribution with an average ($\hat{R}_i$) and a sigma ($\sigma$).

In the simplified embodiment of FIG. 2A, $ACC_{2A}$ is arranged with a third input that offsets the accumulator by $-\hat{R}_l/j$ wherein j is the number of times $ACC_{2A}+REG_{2A}$ is time multiplexed, and wherein $-\hat{R}_l/j$ can be compiled and programmed.

Consider that the output of the accumulator here would be a signed value with an average that follows an approximate value close to zero scale.

Moreover, here the activation function input compares the $$S_{ij} = \pm \sum_{j=1}^{m}\sum_{i=1}^{n} R_{ij}$$

signal with a (compiled and programmed) normalized biased and offset signal $C_k=B_k/G_k-\hat{R}_l$ wherein $B_K$ is an offset signal, $G_K$ is normalization gain factor, and $\hat{R}_l$ is the average of the predictably distributed set of $R_i=P_i \times Q_i$.

For applications in which the profile of a set of $R_i=P_i \times Q_i$ signals follow a $\hat{R}_l$ and a $\sigma$, an accumulator with smaller bit-width can be arranged for the $ACC_{2A}+REG_{2A}$ circuit block, as well as a smaller bit-width magnitude comparator (e.g., for the activation function) can be arranged, which saves on IC die area and lowers cost.

Additionally, notice that some of the benefits summarized in section 1A and the earlier section titled DETAILED DESCRIPTION are applicable here.

Figure 2B:
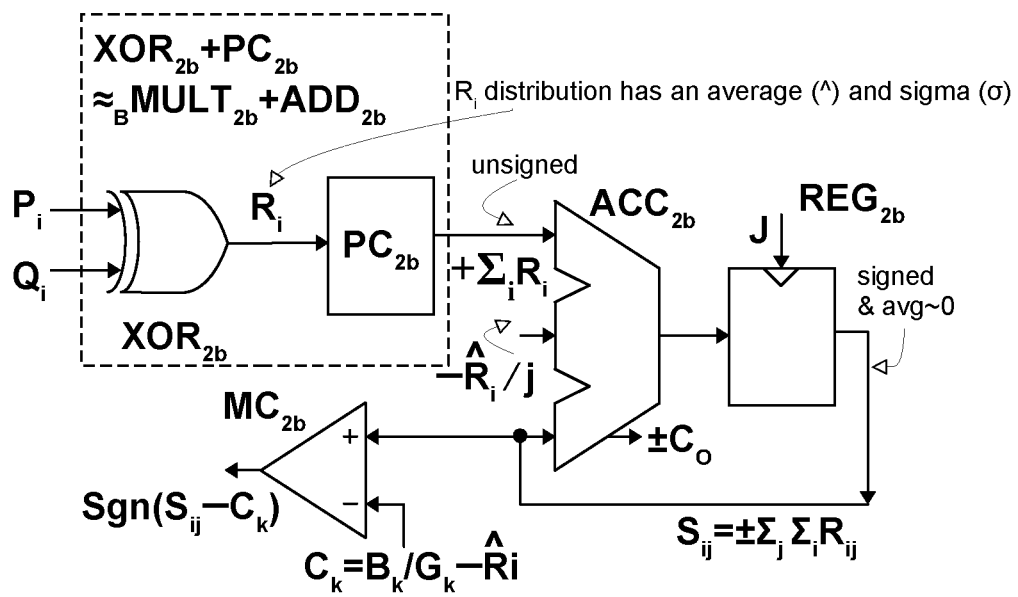
FIG. 2B is another simplified illustration of an embodiment of FIG. 1C in which an $ACC_{2B}$ circuit block can be programmed such that the profile of the output of the $ACC_{2B}$ circuit block is a signed value with an average value around zero scale, and wherein the plurality of output signal values of the $XOR_{2B}$ logic circuit ($R_i$=$P_i \oplus Q_i \approx P_i \times Q_i$) follow a distribution with an average ($\hat{R}_j$) and a sigma ($\sigma$).

Section 2B—Description of FIG. 2b

FIG. 2B is another simplified embodiment of FIG. 1C in which a $ACC_{2B}$ circuit block can be programmed such that the profile of the output of the $ACC_{2B}$ circuit block is a signed value with an average value around zero scale, and wherein the plurality of output signal values of the $XOR_{2B}$ logic circuit ($R_i=P_i \oplus Q_i \approx P_i \times Q_i$) follows a distribution with an average ($\hat{R}_l$) and a sigma ($\sigma$).

The simplified embodiment of FIG. 2B is similar to that of FIG. 2A in that $ACC_{2B}$ is also arranged with a third input that offsets the accumulator by $-\hat{R}_l/j$ wherein j is the number of times the $ACC_{2B}+REG_{2B}$ circuit block is time multiplexed, and wherein $-\hat{R}_l/j$ can be compiled and programmed.

Let's take an example of a 6-bit accumulator.

$$\sum_{i=1}^{n} R_i$$

has an unsigned full-scale value of integer 64, and an unsigned average value of integer 32. Here, the integer 32 value corresponds to one-half of the XOR outputs in a logical 1 state (population counter at Half-Scale=HS), and the integer 64 value corresponds to all XOR outputs in a logical 1 state (population counter at Full-Scale=FS). Note that the output of the 6-bit accumulator could also be a signed value whose average would track to approximately zero scale. Let's for a moment ignore the $-\hat{R}_l/j$ accumulator offset for clarity of illustration. Assume a $$\sum_{i=1}^{n} R_i$$

having an integer value of 67 is fed (in its digital form) to the 6-bit accumulator. The accumulator computes a (small bit-width residue digital word corresponding to the) residual integer value 3 (67 modulo $2^6$), and the Carry Output ($C_O$) of the accumulator $ACC_{2B}$'s MSB is activated (which may be ignored or utilized as an MSP event counter depending on the needs of the end-application). The small bit-width residue digital word corresponding to the residual value of 3 is then fed into a small bit-width magnitude comparator (CMP), which saves on area and cost.

Also, please refer to the benefits summarized in section 1C and the earlier section titled DETAILED DESCRIPTION that are applicable here.

Figure 3A:
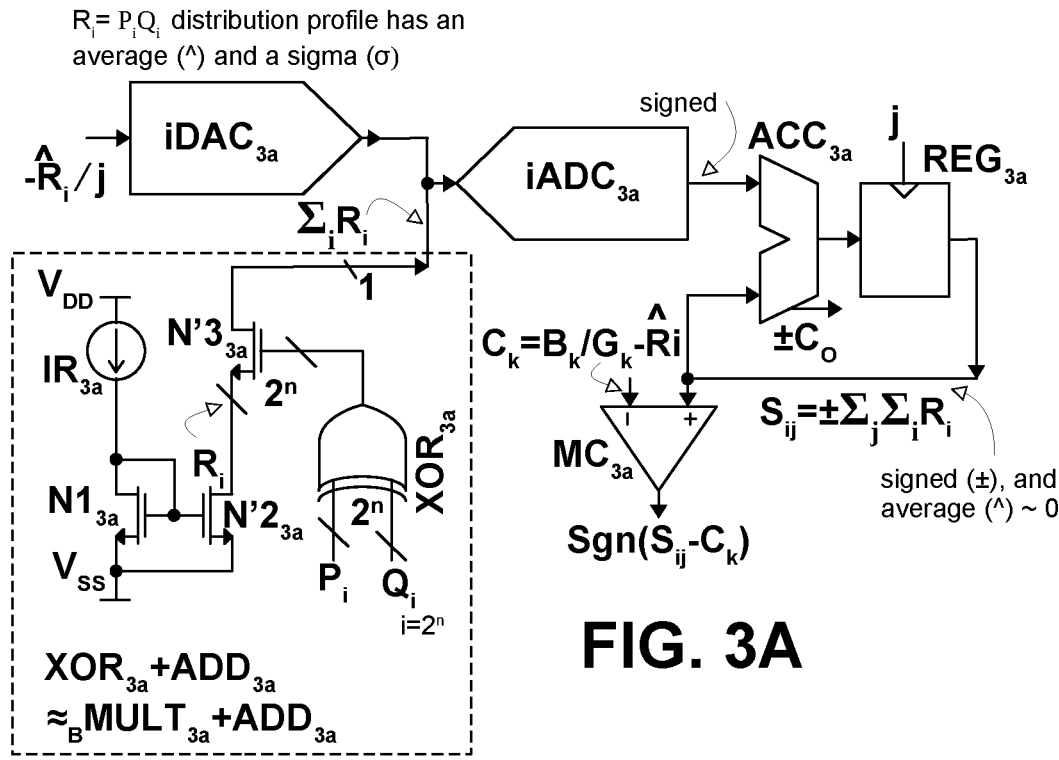
FIG. 3A is another simplified illustration of an embodiment of FIG. 2B in which a $XOR_{3A}$+$ADD_{3A}$ circuit block is arranged in mixed-mode, analog, or both. Moreover, the analog output value of the $XOR_{3A}$+$ADD_{3A}$ circuit block is (offset) programmed by a $-\hat{R}_j/J$; value before it communicates with the accumulator $ACC_{3A}$+$REG_{3A}$ circuit block.

Section 3A—Description of FIG. 3A

FIG. 3A is another simplified embodiment of FIG. 2B in which a $XOR_{3A}+ADD_{3A}$ circuit block is arranged in mixed-mode, analog, or both. Moreover, the analog output value of the $XOR_{3A}+ADD_{3A}$ circuit blocks is (offset) programmed by $-\hat{R}_l/j$ value before it communicates with the accumulator $ACC_{3A}+REG_{3A}$ circuit block.

Here, the section inside the dashed-line box ($XOR_{3A}+ADD_{3A}$) illustrates a circuit schematic of a single-ended current-mode multiply-accumulate (iMAC) for binarized neural networks (BNN, see U.S. Pat. No. 10,915,298 issued Feb. 9, 2021). The mixed-signal current-mode XOR circuit block is comprised of a plurality of equally sized current sources (e.g., $N'2_{3A}$) that are selected by a plurality (of $2^n$) pairs of digital words ($P_i$ and $Q_i$). In the embodiment depicted in FIG. 3A, the $2^n$ pairs of digital words $P_i$ and $Q_i$ feed the inputs of a plurality of $2^n$ $XOR_{3A}$s, the outputs of which select the plurality of current sources. Summation (i.e., population count) of the bitwise logical state of 1 at the output of the XOR-selected current sources is accomplished by simply coupling the outputs of the current sources together, thereby generating a $$\sum_{i=1}^{n} R_i$$

current signal.

The $iDAC_{3A}$ generates an offset current signal $-\hat{R}_l/j$ that is added to the $$\sum_{i=1}^{n} R_i$$

current signal; that sum is digitalized via $iADC_{3A}$.

Note that the output of $iADC_{3A}$ is a signed digital signal that is (temporally) accumulated by the $ACC_{3A}+REG_{3A}$, which can be time-multiplexed for a programmable j number of times.

Also, note that the digital output of $ACC_{3A}+REG_{3A}$ is a signed digital word $$S_{ij} = \pm \sum_{j=1}^{m}\sum_{i=1}^{n} R_{ij}$$

that averages approximately around zero-scale.

A magnitude comparator ($MC_{3A}$) performs an activation function to generate a sign signal ($S_{ij}-C_k$) by comparing the $$S_{ij} = \pm \sum_{j=1}^{m} \sum_{i=1}^{n} R_{ij}$$

digital word and a normalized biased and offsetted digital word $C_k=B_k/G_k-\hat{R}_l$, wherein $B_K$ is an offset signal, $G_K$ is a normalization gain factor, and $\hat{R}_l$ is the average of a predictably distributed set of $R_i=P_i \times Q_i$.

Similar to the example previously described in section 2B, the $ACC_{3A}+REG_{3A}$, as well as the $MC_{3A}$ functions, can be arranged with a smaller bit-width to improve cost-performance of the BNN IC embodiment disclosed here, when the set of output signal values ($R_i=P_i \times Q_i$) of the MULT function follows a distribution having an average ($\hat{R}_l$) and a sigma (σ), for example and without limitation, a predictable distribution such as a Gaussian distribution.

One of the benefits of the disclosed temporal-spatial MAC arrangement is reduction of the accumulated error signal during accumulation. This is because each $$\sum_{i=1}^{n} R_i$$

signal (which is a temporal analog summation signal) gets digitized by the ADC with a fresh start, and the digital accumulation performs each of the sequential temporal summations with each fresh batch of the ADC's digital output data in the digital-mode, which minimizes and or limits carry-over residual or cumulative errors.

Additionally, please refer to the benefits summarized in section 2B and the earlier section titled DETAILED DESCRIPTION that are applicable here.

Figure 3B:
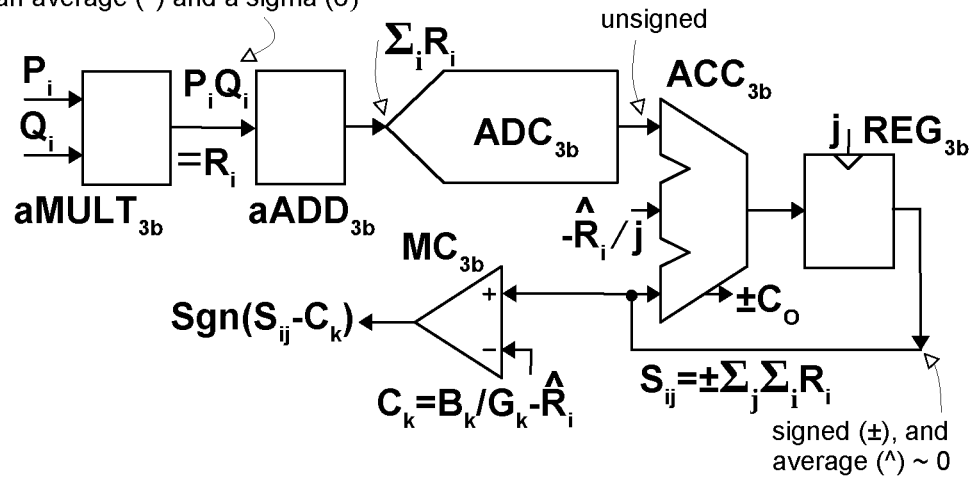
FIG. 3B is another simplified illustration of an embodiment of FIG. 2A in which the $aMULT_{3B}$+$aADD_{3B}$ function is performed in mixed-signal or analog, and in which the programmable activation function is a sign function, such as a sigmoid function.

Section 3B—Description of FIG. 3b

FIG. 3B is another simplified embodiment of FIG. 2A in which the $aMULT_{3B}+aADD_{3B}$ circuit block is mixed-signal, analog, or both, and in which the programmable activation function is a sign function, such as a sigmoid function.

In this embodiment, a plurality of pairs of input signals ($P_i$ and $Q_i$) are multiplied (via $aMULT_{3B}$) wherein $R_i=P_i \times Q_i$ and added via $aADD_{3B}$ to produce a summation output $$\sum_{i=1}^{n} R_i,$$

which is digitized via an $ADC_{3B}$. In other embodiments, the signals are mixed-signal, analog, or both.

Note that the set of output signal ($R_i=P_i \times Q_i$) values of the $MULT_{3B}$ follows a distribution with an average ($\hat{R}_l$) and a sigma (σ), and that the output of $ADC_{3B}$ is arranged as being unsigned. In another embodiment, the signals are signed.

The explanations provided in section 2A (that pertained to FIG. 2A) are applicable here regarding similar arrangements for the accumulator function $ACC_{3B}+REG_{3B}$ whose output communicates with the magnitude comparator $MC_{3B}$.

One of the benefits of the disclosed temporal-spatial MAC arrangement is a substantial reduction of the total accumulated error signal during accumulation. This is because each batch of $$\sum_{i=1}^{n} R_i$$

signal (which is a temporal analog summation signal) gets digitized by the ADC with a fresh start, and the digital accumulation performs each of the sequential temporal summations with each fresh batch of the ADC's digital output data in the digital-mode, which minimizes any carry-over residual or cumulative errors.

Also, please refer to the benefits summarized in section 2A and the earlier section titled DETAILED DESCRIPTION that are applicable here.

Figure 4A:
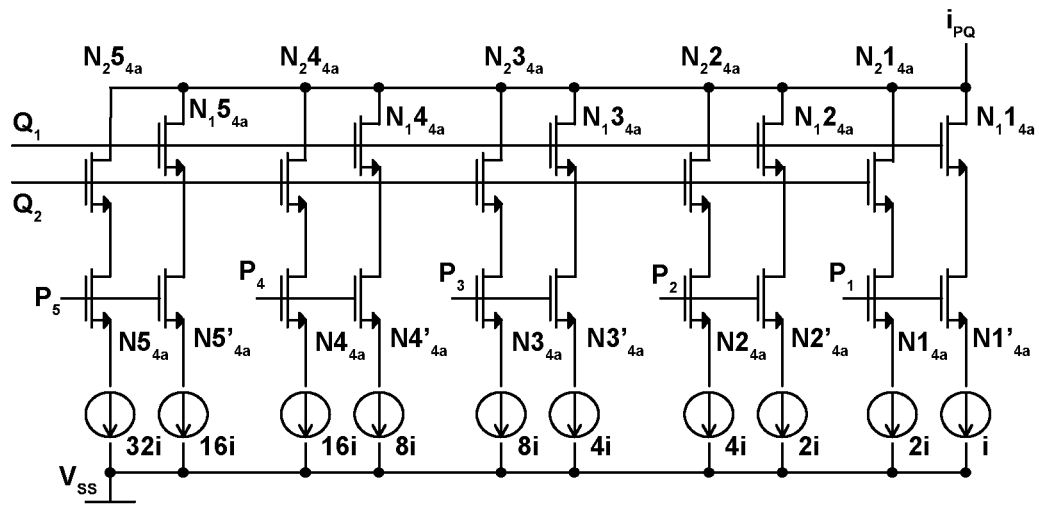
FIG. 4A is a simplified illustration of a digital-input to current analog-output meshed multiplier comprising a Q digital-input port that is 2-bits wide, a P digital-input port that is 5-bits wide, and an analog current port $I_{PQ}$.

Section 4A—Description of FIG. 4A

FIG. 4A is a simplified digital-input to current analog-output meshed multiplier comprising a Q digital-input port that is 2-bits wide, a P digital-input port that is 5-bits wide, and an analog current port $I_{PQ}$.

A full description of the schematic illustrated in FIG. 4A is provided in the digital-input to analog-signal current-output multiplier description disclosed in U.S. Pat. No. 10,789,046 issued on Sep. 29, 2020.

An embodiment such as the circuit illustrated in FIG. 4A may be utilized in some of the analog MULT embodiments depicted in this disclosure.

Also, please refer to the benefits of current mode signal processing that is summarized in the earlier section titled DETAILED DESCRIPTION that are applicable here.

Figure 4B:
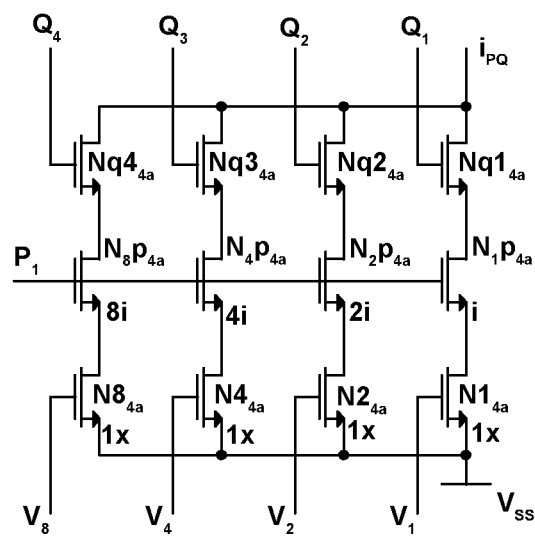
FIG. 4B is another simplified illustration of a digital-input to current analog-output meshed multiplier comprising a Q digital-input port that is 4-bits wide, a P digital-input port that is 1-bit wide, and an analog current port $I_{PQ}$.

Section 4B—Description of FIG. 4b

FIG. 4B is another simplified digital-input to current analog-output meshed multiplier comprising a Q digital-input port that is 4-bits wide, a P digital-input port that is 1-bit wide, and an analog current port $I_{PQ}$.

A full description of the schematic illustrated in FIG. 4B is provided in the digital-input to analog-signal current-output multiplier descriptions disclosed in U.S. Pat. No. 10,789,046 issued on Sep. 29, 2020, and U.S. Pat. No. 10,862,501 issued on Dec. 8, 2020.

A, embodiment such as the circuit illustrated in FIG. 4B may be utilized in some of the analog MULT circuit blocks depicted in this disclosure.

Please take note of the benefits of current mode signal processing that is summarized in the earlier section titled DETAILED DESCRIPTION that are applicable here.

Figure 5A:
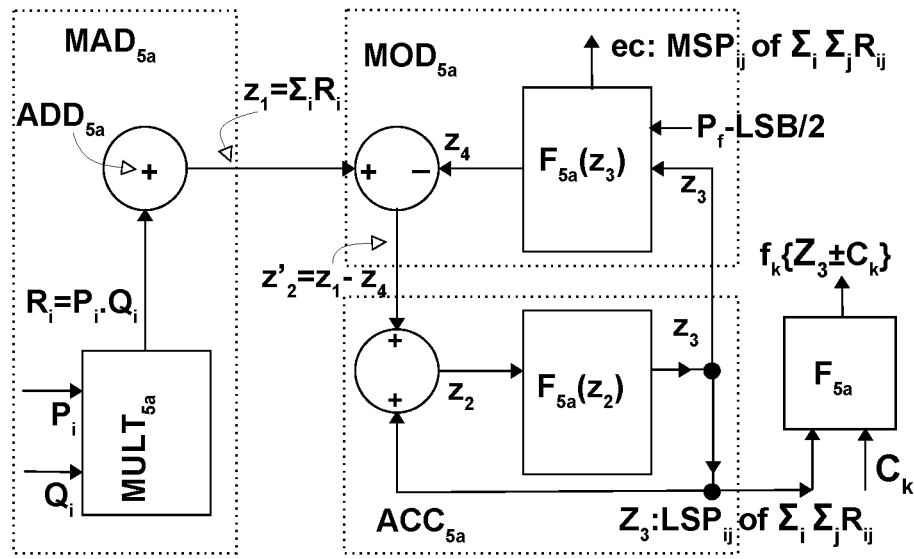
FIG. 5A is a simplified circuit block of an embodiment illustrating a spatial (also referred to as parallel) bank of MAC ($MAD_{5A}$: $MULT_{5A}$+$ADD_{5A}$) circuit blocks whose output communicates with a temporal (also referred to as serial) programmable-hybrid-accumulator ($MOD_{5A}$ & $ACC_{5A}$) circuit block. A modulo operating ($MOD_{5A}$) function around an accumulation feedback loop enables keeping the output value of the accumulator ($ACC_{5A}$) from overflowing, while generating a Most-Significant-Portion (MSP) of the accumulated signal (at an EC port) as well as a residue Least-Significant-Portion (LSP) of the accumulated signal (at an $ACC_{5A}$ output port) that communicates with an activation function ($F_{5A}$).

Section 5A—Description of FIG. 5A

FIG. 5A is a simplified IC block diagram of an embodiment illustrating a (spatial) bank of a parallel plural MAC ($MULT_{5A}+ADD_{5A}$) circuit block whose output communicates with a (temporal) programmable programmable-hybrid-accumulator ($MOD_{5A}$ & $ACC_{5A}$) circuit block, wherein $MOD_{5A}$ & $ACC_{5A}$ are arranged in accordance with a Programmable Hybrid Accumulation (PHA) method.

The PHA method arranges a modulo operating ($MOD_{5A}$) circuit block around an accumulation feed-back loop that facilitates keeping the output value of the accumulator ($ACC_{5A}$) from overflowing, while the programmable-hybrid-accumulator generates a Most-Significant-Portion (MSP) of the accumulated signal as well as a Least-Significant-Portion (LSP) of the accumulated signal, and wherein the LSP of the accumulated signal communicates with an activation function (FSA).

Modulo operation is amply discussed in the literature. A basic summary is provided here. Further discussions, citations, and references can be found in reports such as Daan Leijen, 2001, "Division and Modulus for Computer Scientists." In computation, modulo operation returns the remainder or signed remainder of a division, after one number is divided by another (called the modulus of the operation). Given two positive numbers 'a' and 'n', 'a' modulo 'n' (abbreviated as 'a mod n') is the remainder of the Euclidean division of 'a' by 'n', where 'a' is the dividend and 'n' is the divisor.

A similar mathematical computational system called a residue numeral system (RNS), and variations of RNS, also represent integers by their values modulo and several pair-wise coprime integers referred to as the moduli. Note that RNS must be a set of moduli, not just one divisor as later explained. RNS can uniquely represent numbers from 0 to the product of the moduli−1. This representation, allowed by the Chinese remainder theorem (CRT) and variations of CRT, similarly asserts that if N is the product of the moduli, then there is in an interval of length N, exactly one integer having any given set of modular values. The arithmetic of a RNS is also called multi-modular arithmetic. To explain the RNS further, suppose a' and 'm' are any two integers with 'm' not zero. We say 'r' is a residue of a modulo 'm' if a=r (mod m). This is the same as 'm' divides a−r, or a=r+q×m for some integer 'q'. The division algorithm tells us that there is a unique residue 'r' satisfying 0<r<|m|, and this remainder 'r' is called the least non-negative residue of a modulo 'm'.

The $MOD_{5A}$ and $ACC_{5A}$ circuit block embodiment of FIG. 5A illustrates an IC block diagram of the disclosed PHA method. The following is first a simple numeric example to describe its basic operations with analog integer value signal for clarity of explanation:

For an objective accumulated analog value of 4 that is programmed with modulo analog value of 3 (4 mod 3'), the final analog output value at the output of the programmable-hybrid-accumulator would evaluate to an analog value of 1 because 4 divided by 3 has a quotient of 1 and a remainder of an analog value of 1. Here, the objective accumulated analog output value of 4 corresponds to an MSP that is the quotient 1, and the analog residual value of 1 is the LSP of the output of the mod-hybrid-accumulator. In arranging the programmable-hybrid-accumulator with a single comparator, for example in one embodiment, when the output signal of the programmable-hybrid-accumulator is greater than analog value of 3, then the comparator enables a value of 3 to be subtracted from the mod-hybrid-accumulator's input, thus bringing the output of a programmable-hybrid-accumulator back into a bounded range (avoiding overflow) by limiting the peak-to-peak signal swing at the output of the accumulator (e.g., less than an analog value of 3).

As such, when arranging an accumulator in accordance with one embodiment of the PHA method, the accumulator can continue accumulating a plurality of product signals while the output of the accumulator can be kept from overflowing or breaching the operating $V_{DD}$ power supply limit. This is critical in low power machine learning applications (e.g., sub-1V). Note also that the programmable-hybrid-accumulator (PHA) circuit can be equipped with an event counter (EC) that keeps track of the number of times the output of the PHA detects an analog value greater than 3, in this example. This function can be beneficial for an accumulator that can be programmed to accumulate a wide range of a plurality of product signals while the MAC IC continues operating at low $V_{DD}$ levels. Such a trait, accordingly, enables a Machine Learning IC to optimize an objective cost-function by zooming in on the LSP of the accumulated product while concurrently having the option to capture the MSP of the output of the accumulator, if the inference or training functions require it.

In another example, consider an objective accumulation target that corresponds to an analog value of 12, wherein the programmable-hybrid-accumulator is programmed to a modulo value of 4 (i.e., '12 mod 4') which would evaluate to 0. This is because the division of 12 by 4 has a quotient of 3 and a remainder of 0. Here, as the output of the accumulator moves from zero-scale towards the objective analog value of 12, the PHA's comparator would trigger 3 times (e.g., each time the output of the PHA output has risen above 4) and 4 analog values have been consecutively subtracted from the input of the mod-hybrid-accumulator, which causes the output of the PHA to converge on zero (because there is nothing to subtract from 12 after multiplying 4 times 3). As such, the LSP of the output of the PHA has an analog value of 0, while the quotient of 3 is the MSP of the output of the PHA.

In FIG. 5A, a plurality of pairs of signals $P_i$ and $Q_i$, which can be digital, analog, or mixed signal, are multiplied through a $MULT_{5A}$ circuit. The plurality of $P_i \times Q_i = R_i$ products at the output of the $MULT_{5A}$ are summed together via an $ADD_{5A}$ circuit to generate a product sum signal $$Z_1 = \sum_{i=1}^{n} R_i.$$

Setting aside the contribution of the $MOD_{5A}$ function initially (e.g., when the feed-back signal $Z_4=0$, $Z'_2=Z_1-Z_4 \rightarrow Z_1$), the $Z'_2 \rightarrow Z_1$ signal is received by a $ACC_{5A}$ circuit which is depicted as an accumulator function block $F_{5A}(Z_2)$ with a feedback around it illustrating a temporal accumulation of a time-multiplexed series of inputted $Z'_2$ signals, while a $Z_3$ signal would be in the making at the output of the $ACC_{5A}$ circuit.

While streams of $Z_1$ signals are received by the $ACC_{5A}+MOD_{5A}$ circuit that is the mod-hybrid-accumulator, the $MOD_{5A}$ section (that is placed around a negative feedback loop of the $ACC_{5A}$) receives the $Z_3$ signals from the output of $ACC_{5A}$ which can then be processed through a $F_{5A}(Z_3)$ functional block with a single-level or multi-level modulo $P_f$ signal(s), and in one embodiment, adjustable depending on a cost-performance objective.

For example, in a single-level modulo operation, the $F_{5A}$ $(Z_3)$ can be arranged to function as follows: if $Z_3 > P_f - LSB/2$, then $Z_4=P_f$, otherwise $Z_4=0$. Bear in mind that the input to the $ACC_{5A}$ is $Z'_2=Z_1-Z_4$ and if $Z_3 > P_f - LSB/2$, then $Z_4=P_f$ which translates to $Z'_2=Z_1-P_f$. This is the mechanism by which the accumulation process progress, while a plurality of programmed $P_f$ values are accordingly and sequentially subtracted (by design) from the input of $ACC_{5A}$ so that the $ACC_{5A}$ output does not overflow.

Also, refer to section 5B which provides another embodiment of single-level modulo operations, and sections 6A and 6B which describe other embodiments of multiple-level finer modulo operations.

The final $Z_3$ signal represents the Least-Significant-Portion (LSP) of the final accumulated $Z_1$ value in mod $P_f$, whereas the event counter (EC) represents the Most-Significant-Portion (MSP) of the final accumulated $Z_1$ value that represents the quotient which is the number of times the event $Z_3>LSB/2$ could be detected up to the final accumulation $Z_1$. Accordingly, $Z_3$ represents the LSP of $$\sum_{j=1}^{m}\sum_{i=1}^{n}R_{ij},$$

and the number or times the event counter EC signal is triggered during the accumulation cycle represents the MSP of $$\sum_{j=1}^{m}\sum_{i=1}^{n}R_{ij}.$$

A programmed and compiled bias signal ($C_K$) and the final $Z_3$ are received by an activation function ($F_{5A}$) circuit block which generates an activation signal, $f_K\{Z_3\pm C_K\}$. Note again that the sign of $C_K$ must be either + or − depending on training algorithms and the objectives of an end-application In addition to the benefits of programmable programmable-hybrid-accumulator noted above, please take note of some of the other benefits summarized in the earlier section titled DETAILED DESCRIPTION that are applicable here.

Figure 5B:
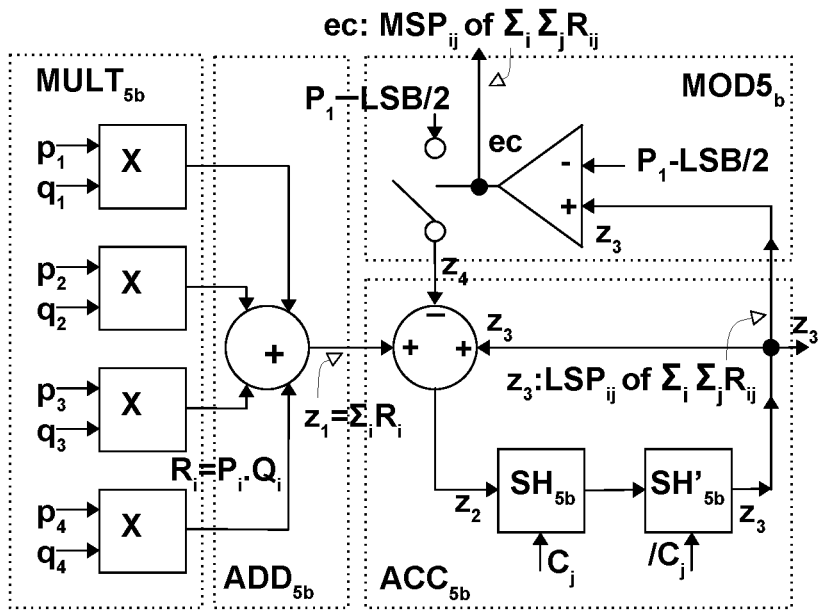
FIG. 5B is another simplified embodiment of FIG. 5A (excluding the illustration of $F_{5A}$ as the activation circuit block), in which a plurality of pairs of input signals ($P_i$ & $Q_i$) are multiplied (via $MULT_{5B}$) and whose respective products are then added together (via $ADD_{5B}$). Here, the output of MULT$_{5B}$ & ADD$_{5B}$ communicates with a programmable-hybrid-accumulator (MOD$_{5B}$ & ACC$_{5B}$) circuit block. In the MOD$_{5B}$ & ACC$_{5B}$, the ACC$_{5B}$ section is comprised of two cascaded out-of-phase sample-and-hold (SH$_{5B}$ & SH'$_{5B}$) circuit blocks. Moreover, the MOD$_{5B}$ circuit block (arranged around the feed-back loop of ACC$_{5B}$) is comprised of (an comparator that causes a P value to be subtracted from the input of the ACC$_{5B}$ when the output value of ACC$_{5B}$ exceeds a P–LSB/2 value, and wherein P can be programmed to a value that may be but is not necessarily proportional to full-scale (FS=V$_{REF}$).

Section 5B—Description of FIG. 5b

FIG. 5B is another simplified embodiment of FIG. 5A, excluding the activation function, in which a plurality of pairs of input signals ($P_i$ & $Q_i$) are multiplied (via $MULT_{5B}$) and whose respective products are then added together (via $ADD_{5B}$).

Notice that for clarity of description and illustration, the embodiment of $MULT_{5B}+ADD_{5B}$ circuit blocks depict only 4 pairs of input signals are multiplied and then added together. In other embodiments, a substantially larger number of pairs of signals can be processed in accordance with cost-performance trade-offs and objectives of an end-application.

Here, the output of $MULT_{5B}$ & $ADD_{5B}$ communicate with a programmable-hybrid-accumulator ($MOD_{5B}$ & $ACC_{5B}$) circuit block, arranged for a single-level modulo operation programmed at a $P_1$ value.

The $ACC_{5B}$ section of the $MOD_{5B}$ & $ACC_{5B}$ block is comprised of two cascaded, out-of-phase sample-and-holds ($SH_{5B}$ & $SH'_{5B}$), wherein the output of the second SH'5B is fed back to the input of the first $SH_{5B}$ to perform the function of signal accumulation.

For a single-level modulo operation, the $MOD_{5B}$ function (arranged around the feed-back loop of $ACC_{5B}$) is comprised of a comparator that causes a single-level $P_1$ value to be subtracted from the input of $ACC_{5B}$ when the output value of $ACC_{5B}$ exceeds a value of $P_1-LSB/2$, and wherein $P_1$ can be programmed to a value (here, but not necessarily) proportional to full-scale (e.g., $P_1=V_{REF}$). In other words, if $Z_3>P_1-LSB/2$, then $Z_4=P_1$, otherwise $Z_4=0$. Notice that arranging such a single-level modulo operation (with a comparator whose output controls whether to subtract a $P_1$ value or not) is equivalent to a one-bit ADC functioning as a single comparator whose output controls a one-bit DAC that has a full-scale of $-P_1$.

Note that $Z_3$ represents the LSP of $$\sum_{j=1}^{m}\sum_{i=1}^{n}R_{ij},$$

and the number of times the event counter EC signal is triggered during the temporal accumulation cycle represents the MSP of $$\sum_{j=1}^{m}\sum_{i=1}^{n}R_{ij}.$$

In addition to the benefits summarized in section 5A, also relevant to the embodiment disclosed in FIG. 5B here, please take note of some of the other benefits summarized in the earlier section titled DETAILED DESCRIPTION that are applicable here.

Figure 6A:
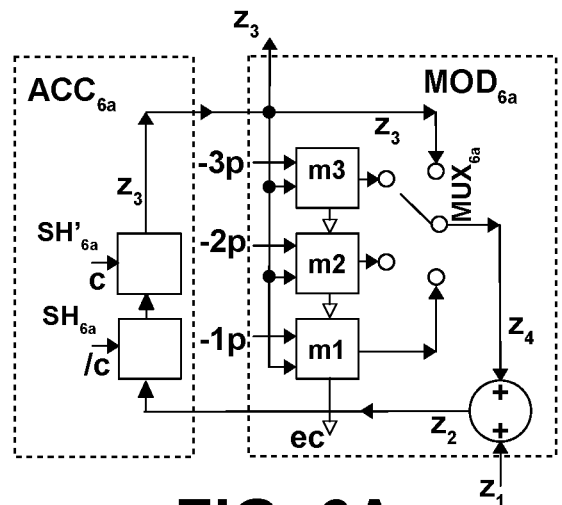
FIG. 6A is another simplified illustration of the programmable-hybrid-accumulator section of FIG. 5A (e.g., MOD$_{5A}$ corresponds to MOD$_{6A}$ and ACC$_{5A}$ corresponds to ACC$_{6A}$) wherein finer multi-level modulo operations, arranged around the feedback loop of ACC$_{6A}$, are performed to generate incremental segments (e.g., P–LSB/2, 2P–LSB/2, and 3P–LSB/2). Also, the ACC$_{6A}$ function is comprised of two cascaded out-of-phase sample-and-holds (SH$_{6A}$ & SH'$_{6A}$).

Section 6A—Description of FIG. 6A

FIG. 6A is another simplified embodiment of the programmable-hybrid-accumulator section of FIG. 5A (e.g., $MOD_{5A}$ corresponds to $MOD_{6A}$ and $ACC_{5A}$ corresponds to $ACC_{6A}$).

The $ACC_{6A}$ function is comprised of two cascaded out-of-phase sample-and-holds ($SH_{6A}$ & $SH'_{6A}$) with the output of the second SH fed-back to the input of the first SH, like the embodiment disclosed in FIG. 5B.

$MOD_{6A}$ is arranged to perform a finer modulo operation (arranged around the feed-back loop of $ACC_{6A}$) wherein the $Z_3$ signal is monitored and compared against multiple levels or incremental segments (e.g., P−LSB/2, 2P−LSB/2, and 3P−LSB/2) for signal processing by $m_1$, $m_2$, $m_3$, and multiplexer ($MUX_{6A}$) functional blocks in accordance with the following programmed arrangement:

If $Z_3>1P-LSB/2$, then $Z_4=Z_3-1P$, otherwise $Z_4=Z_3$.
If $Z_3>2P-LSB/2$, then $Z_4=Z_3-2P$, otherwise $Z_4=Z_3$.
If $Z_3>3P-LSB/2$, then $Z_4=Z_3-3P$, otherwise $Z_4=Z_3$.

Although there is an IC cost-performance trade-off limit, note that there is no functional limit to the amount of stacking that could occur here, and the illustration in FIG. 6A depicting a stack of three levels (1P, 2P, and 3P) is for schematic and descriptive clarity. Also, bear in mind that LSB is the least significant bit of a full-scale reference signal ($S_{REF}$). By way of example and without limitation, for $S_{REF}=V_{REF}=1V$ processed in a 7-bit system having $2^7$ increments to compute to 128 increments, the LSB of that embodiment is $1V/128\sim7.8$ mV.

The signal $Z_2$ is received by the accumulator $ACC_{6A}$, wherein $Z_2=Z_1+Z_4$, and wherein $$Z_1 = \sum_{i=1}^{n}R_i$$

with $R_i=P_i\times Q_i$ for i ranging from 1 to n. Also keep in mind that a final accumulated $Z_3$ value represents a (programmed) least significant portion of the $$\sum_{j=1}^{m}\sum_{i=1}^{n}R_{ij}$$

signal value.

In the embodiment of FIG. 6A, the $Z_4$ signal value can be selected to be either the $Z_3$ signal value or the $Z_3$ signal value minus 1P, 2P, or 3P signal values depending on the magnitude of the $Z_3$ signal value, which is the mechanism to keep $Z_3$ within a programmed limited range as the accumulation cycle proceeds (wherein P signal value is proportional to a signal reference value $S_{REF}$). Such signal processing keeps the $Z_4$ signal value (and consequently $Z_2$ and $Z_3$) bounded within a programmed limited range without losing any information pertaining to the final accumulated signal value.

As discussed earlier, the $Z_3$ signal can represent the LSP of $$\sum_{j=1}^{m}\sum_{i=1}^{n}R_{ij},$$

and the event counter EC signal can represent the MSP of $$\sum_{j=1}^{m}\sum_{i=1}^{n}R_{ij}.$$

In another embodiment, the Portion of the signal being in the Least Significant or Most Significant (e.g., MSP and LSP) position can be programmed in accordance with the cost-performance objectives of an end application.

In addition to the benefits summarized in section 5A, also relevant to the embodiment disclosed in FIG. 6A here, please take note of some of the other benefits summarized in the earlier section titled DETAILED DESCRIPTION that are applicable here.

Figure 6B:
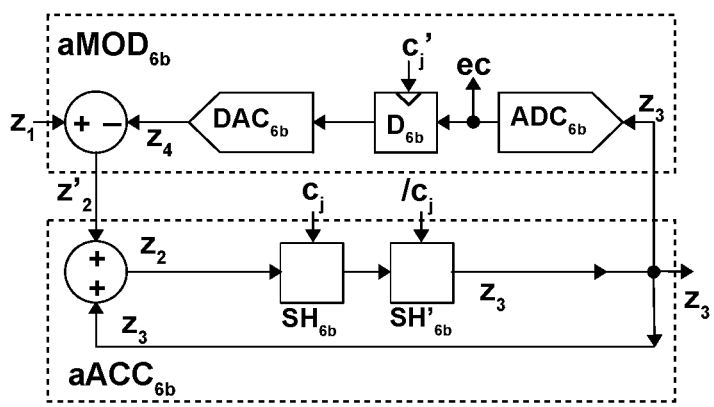
FIG. 6B is another simplified illustration of FIG. 6A in which a modulo operation (of the programmable-hybrid-accumulator section) that is arranged around the feedback loop of aACC$_{6B}$ and the modulo operation is performed in mixed-mode by an aMOD$_{6B}$ circuit block comprising an Analog-to-Digital converter (ADC$_{6B}$), a digital memory/register (D$_{6B}$), and a Digital-to-Analog Converter (DAC$_{6B}$).

Section 6B—Description of FIG. 6b

FIG. 6B is another simplified embodiment of FIG. 6A in which a modulo operation (of the programmable-hybrid-accumulator section) is arranged around the feed-back loop of $aACC_{6B}$ and the modulo operation is performed in mixed-mode by an $aMOD_{6B}$ circuit block comprising of an Analog-to-Digital converter ($ADC_{6B}$), a digital memory/register ($D_{6B}$), and a Digital-to-Analog Converter ($DAC_{6B}$).

The $ACC_{6B}$ function here is comprised of two cascaded out-of-phase sample-and-holds ($SH_{6B}$ & $SH'_{6B}$) the $2^{nd}$ SH's output fed-back to the $1^{st}$ SH's input, like those disclosed in the embodiments of FIGS. 5B and 6A.

The $aMOD_{6B}$ is also arranged here to perform finer modulo operations (also arranged around the feed-back loop of $aACC_{6B}$), wherein as the accumulation cycle proceeds, the $Z_3$ signal is monitored and compared against multiple levels or incremental segments that are processed via $ADC_{6B}$, $D_{6B}$, and $DAC_{6B}$.

In FIG. 6B, notice that $$Z_1 = \sum_{i=1}^{n}R_i$$

wherein $R_i = P_i \times Q_i$ for i ranging from 1 to n, $Z'_2 = Z_1 - Z_4$, and $Z_2 = Z'_2 + Z_3$.

As noted in previous sections, the $Z_3$ signal value at the end of the accumulation cycle can represent the LSP of $$\sum_{j=1}^{m}\sum_{i=1}^{n}R_{ij},$$

and the event counter EC signal (e.g., number of triggered instances) can represent the MSP of $$\sum_{j=1}^{m}\sum_{i=1}^{n}R_{ij}.$$

In yet another embodiment, the $ADC_{6B}$ and $DAC_{6B}$ can be arranged to program the Portion of the signal in the Least Significant or Most Significant (e.g., MSP and LSP), which can be programmed in accordance with the cost-performance objectives of an end application.

The ADC plus DAC of FIG. 6B, to perform an aMOD function, can for example utilize circuits disclosed in U.S. Pat. No. 10,581,448 Issued on Mar. 2, 2020, U.S. Pat. No. 10,804,921 Issued on Oct. 12, 2020, U.S. Pat. No. 10,797,718 Issued on Oct. 5, 2020, U.S. Pat. No. 10,862,495 Issued on Dec. 7, 2020, and U.S. Pat. No. 10,833,692 Issued on Nov. 9, 2020, wherein the $Z_4$ signal can be derived from a residual analog current signal or $I_{A_L}$ signal or $i_{LSP}$ signal, and the event counter (EC) signal can be derived from the MSB of an iADC.

In addition to the benefits summarized in section 6A, also relevant to the embodiment disclosed in FIG. 6B here, please take note of some of the other benefits summarized in the earlier section titled DETAILED DESCRIPTION that are applicable here.

Figure 6C:
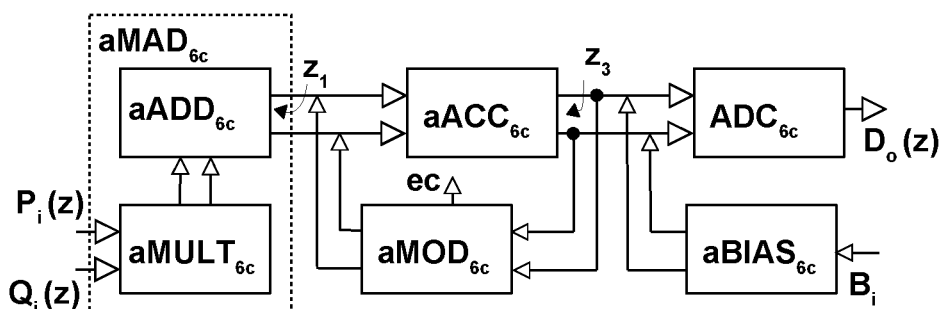
FIG. 6C is another simplified embodiment of FIG. 5A implemented in a differential analog mixed-mode, or both, wherein the signals from the input to the output are processed through the MAC IC differentially (i.e., through aMULT$_{6C}$, aADD$_{6C}$, aACC$_{6C}$, and aMOD$_{6C}$ circuit blocks). Such differential signal processing can improve performance such as better noise rejection, lower drift, less offset, better power supply rejection, and lower charge injection. A differential ADC$_{6C}$ (including for example a differential comparator depicting a 1-bit ADC) can perform the activation function corresponding to the F$_{5A}$ function in FIG. 5A.

Section 6C—Description of FIG. 6c

FIG. 6C is another simplified embodiment of FIG. 5A implemented in a differential analog, mixed-mode, or both, wherein the signals from the input to the output are processed through the MAC IC differentially (i.e., through $aMULT_{6C}$, $aADD_{6C}$, $aACC_{6C}$, and $aMOD_{6C}$ circuit blocks) which can improve performance specifications such as better noise rejection, lower drift, less offset, better power supply rejection, and lower charge injection.

Here, a differential $ADC_{6C}$ (including for example a differential comparator depicting a 1-bit ADC) can perform the activation function corresponding to $F_{5A}$ of FIG. 5A.

In FIG. 6C, an analog, mixed-mode, or both, multiply and add ($aMAD_{6C}$) circuit block receives a plurality of pairs of analog-signal or mixed-signal inputs $P_i(z)$ and $Q_i(z)$, multiplies each $P_i(z)$ and $Q_i(z)$ pair accordingly, and adds the plurality of $P_i(z) \times Q_i(z)$ products differentially to generate a $Z_1$ signal. As such, $$Z_1 = \sum_{i=1}^{n}R_i(z)$$

wherein $R_i(z) = P_i(z) \times Q_i(z)$ for i ranging from 1 to n.

The $Z_1$ differential signal is received by a differential analog accumulator ($aACC_{6C}$) and as the accumulation cycle proceeds it generates $Z_3$ while a differential analog modulo functional ($aMOD_{6C}$) circuit block arranged around the feed-back loop of $aACC_{6C}$ performs the modulo operations. As discussed in earlier sections, besides subtracting a P value or multiples of P values from $Z_3$ (when needed to keep $Z_3$ from overflowing), the aMOD$_{6C}$ circuit also keeps track of the number of times $Z_3$ exceeds the programmed single-level P values or set of multiple-levels of P values (or incremental segments) which can trigger an Event-Counter (EC).

Accordingly, the differential $Z_3$ signal value at the end of the accumulation cycle can represent the LSP of $$\sum_{j=1}^{m}\sum_{i=1}^{n}R_{ij},$$

and the event counter EC signal (e.g., number of triggered instances) can represent the MSP of $$\sum_{j=1}^{m}\sum_{i=1}^{n}R_{ij}.$$

A differential bias signal is generated by an analog bias circuit (aBIAS$_{6C}$) to offset the differential $Z_3$ signal value before it is fed into a differential ADC$_{6C}$ (including for example a differential comparator as a 1-bit ADC) which can perform the activation function (corresponding to $F_{5A}$ of FIG. 5A) and generate an activation digital word Do(z).

In addition to the benefits summarized in section 5A, also relevant to the embodiment disclosed in FIG. 6C here, please take note of some of the other benefits summarized in the earlier section titled DETAILED DESCRIPTION that are applicable here.

Figure 7A:
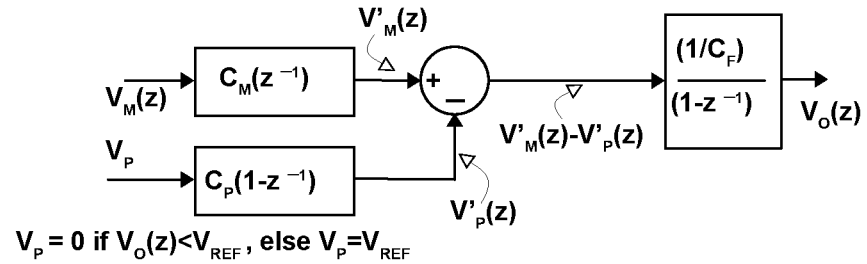
FIG. 7A is a simplified Z-signal flow diagram of the programmable-hybrid-accumulator section (MOD & ACC) that can be utilized in the embodiment of FIG. 5A.

Section 7A—Description of FIG. 7A

FIG. 7A is a Z-signal flow diagram of the programmable-hybrid-accumulator section (MOD & ACC) of the embodiment of FIG. 5A. FIG. 7A models an analog and mixed-mode voltage-input to voltage-output sampling system wherein Vo(z) represents the LSP of the signal that is cycled through accumulation. Moreover, each instant during the accumulation temporal/cycle when Vo(z) exceeds a programmed voltage reference level ($V_{REF}$), an event count (EC) is registered to keep track of the MSP of the signal that is being accumulated.

The signal that is to be accumulated $V_M$ (z) flows through a $C_M$ ($z^{-1}$) that translates to $V_M(z) \times C_M (z^{-1}) = V'_M(z)$ where $C_M$ is a capacitance.

A $V_P$ signal flows through a $-C_P (1-z^{-1})$ that translates to $V_P \times C_P (1-z^{-1}) = V'_P(z)$ where $C_P$ is a capacitance, and where $V_P = 0$ if $V_O(z) < V_{REF}$, else $V_P = V_{REF}$ Combining $V'_p(z)$ and $V'_m(z)$ in the signal flow diagram translates to $V'_m(z) - V'_p(z)$, and when taken through $(1/C_F)/(1-z^{-1})$, it yields a $V_O(z)$ signal in accordance with the following formulation:

$$V_O(z) = V_M(z) \times \frac{C_M}{C_F}/(1-z^{-1}) - V_P \times \frac{C_P}{C_F}$$

wherein $$\begin{cases} V_P = 0 \text{ if } V_O(z) < V_{REF} \\ \text{else } V_P = V_{REF} \end{cases}$$

FIG. 7A models an analog, mixed-mode, or both, voltage-input to voltage-output sampling system, in one embodiment differential, and in another embodiment single ended, wherein Vo(z) represents the LSP of the signal that is being accumulated.

Similarly, as discussed in earlier sections with respect to other embodiments, each instance during the accumulation phase when Vo(z) exceeds a programmed signal level (e.g., $V_{REF}$), an event counter is registered to keep track of the MSP of the signal that is being accumulated.

In one embodiment, to keep Vo(z) from exceeding a programmed signal limit, the disclosed signal flow can be altered to adjust the gain of the integrator which can be accomplished by changing the CF instead of subtracting a signal proportional to $V_{REF}$ from Vo(z).

In another embodiment, to improve precision, instead of the $V_p$ signal getting scaled by $$\frac{C_P}{C_F}$$

capacitor ratio and $V_M$ signal getting scaled by a different capacitor ratio $$\frac{C_M}{C_F},$$

the clock phases in the $V_M(z)$ path can be re-programmed and altered to sample a $-V_p$ equivalent voltage, thereby providing for the signal through the accumulation function and the signal through ratio $$\frac{C_M}{C_F}.$$

Figure 7B:
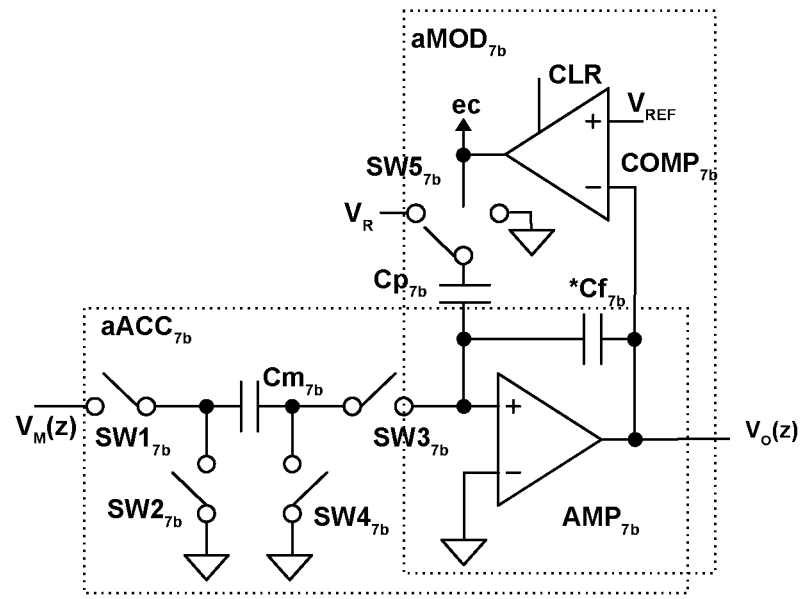
FIG. 7B is a simplified circuit schematic illustrating a programmable-hybrid-accumulator embodiment of the Z-signal flow diagram of FIG. 7A, wherein the programmable-hybrid-accumulator comprises aMOD$_{7B}$ & aACC$_{7B}$ which are intertwined and arranged in a single-ended voltage-mode mixed-signal switch-capacitor configuration.

Section 7B—Description of FIG. 7b

FIG. 7B is a circuit schematic illustrating a programmable-hybrid-accumulator (PHA) embodiment of the Z-signal flow diagram of FIG. 7A, wherein the PHA comprises aMOD$_{7B}$ & aACC$_{7B}$, which are intertwined and arranged in single-ended voltage-mode mixed-signal switch-capacitor configuration.

Applying superposition, let's consider an instance when $V_O$ (z) G $V_{REF}$–LSB/2 and mixed mode aMOD$_{7B}$ circuit does not contribute to $V_O$ (z), and let us presume that charges across capacitors Cm$_{7B}$ and Cf$_{7B}$ are properly initialized. Accordingly, a first batch of $V_M$ (z) signal is received and loaded onto the switch capacitor network of the mixed-mode aACC$_{7B}$ circuit, wherein the aACC$_{7B}$ is arranged for SW1$_{7B}$ and SW4$_{7B}$ to be in phase ($\phi$1) with one another and both as being arranged out of phase with SW2$_{7B}$ and SW3$_{7B}$ which are in phase ($\bar{\phi}$2) with one another, and $\phi$1 and $\bar{\phi}$2 may be non-over-lapping clocks (to reduce charge injection errors). After the first batch of $V_M(z)$ signal is loaded onto a Cm$_{7B}$ capacitor, on the next cycle they are accumulated, integrated, and held on a feed-back capacitor Cf$_m$. As indicated in the previous section, the input-output transfer function of the aACC$_{7B}$ circuit (without the contribution of an aMOD$_{7B}$ circuit) is as follows:

$$V_O(z) = \left[V_M(z) \times \frac{C_M}{C_F}\right]/(1-z^{-1}),$$

until $V_O(z)$ exceeds a programmed signal level proportional to $V_{REF}$ when the aMOD$_{7B}$ circuit kicks-in.

Assuming that charges across capacitors, including Cp$_{7B}$, are properly initialized, if and when $V_O(z) > V_{REF} - $LSB$/2$, COMP$_{7B}$ enables SW5$_{7B}$ to charge the Cp$_{7B}$ capacitor to $V_{REF}$ which translates to subtracting $$V_P \times \frac{C_P}{C_F}$$

from $V_O(z)$, wherein $V_p$ can programmed in proportion to $V_{REF}$. Also, the output of COMP$_{7B}$ triggers the start of counting of the event counter that generates the EC signal.

Accordingly, and as described in section 7A and illustrated in the signal flow diagram of FIG. 7A, the following transfer function for the programmable-hybrid-accumulator circuit of FIG. 7B can be derived:

$$V_O(z) = V_M(z) \times \frac{C_M}{C_F}\bigg)/(1-z^{-1}) - V_P \times \frac{C_P}{C_F}$$

wherein $$\begin{cases} V_P = 0 \text{ if } V_O(z) < V_{REF} \\ \text{else } V_P = V_{REF} \end{cases}$$

As noted earlier, the differential $V_O(z)$ signal value at the end of the accumulation cycle can represent the LSP of $$\sum_{j=1}^{m} V_O(z),$$

and the event counter EC signal (e.g., number of triggered instances) can represent the MSP of $$\sum_{j=1}^{m} V_O(z).$$

Note that in FIG. 7B, a single-ended (switch-capacitor integrator intertwined with an event driven subtraction) is utilized to illustrate the PHA circuit for illustrative and descriptive clarity. In another embodiment, a differential version of FIG. 7B would provide additional benefits such as better noise rejection, lower drift, less offset, better power supply rejection, and switch lower charge injection, which was discussed in section 6C and illustrated in the MOD and ACC section of FIG. 6C. In yet another embodiment, the programmable-hybrid-accumulator can be arranged as multi-level (instead of single-level with a CMP$_{7B}$ comparator) via for example cascading an ADC and a DAC.

As noted in section 7A, instead of subtracting a signal proportional to $V_{REF}$ from Vo(z), the disclosed embodiment has the flexibility of keeping Vo(z) from exceeding a programmed signal magnitude limit, by altering the gain of the integrator which can be accomplished by for example changing the CF.

In addition to the benefits of sharing circuitry between the mixed-mode switch capacitor based aMOD$_{7B}$ and aACC$_{7B}$ circuits which saves silicon die area and improves matching, please take note of some of the other benefits summarized in the earlier section titled DETAILED DESCRIPTION that are applicable here.

Figure 8A:
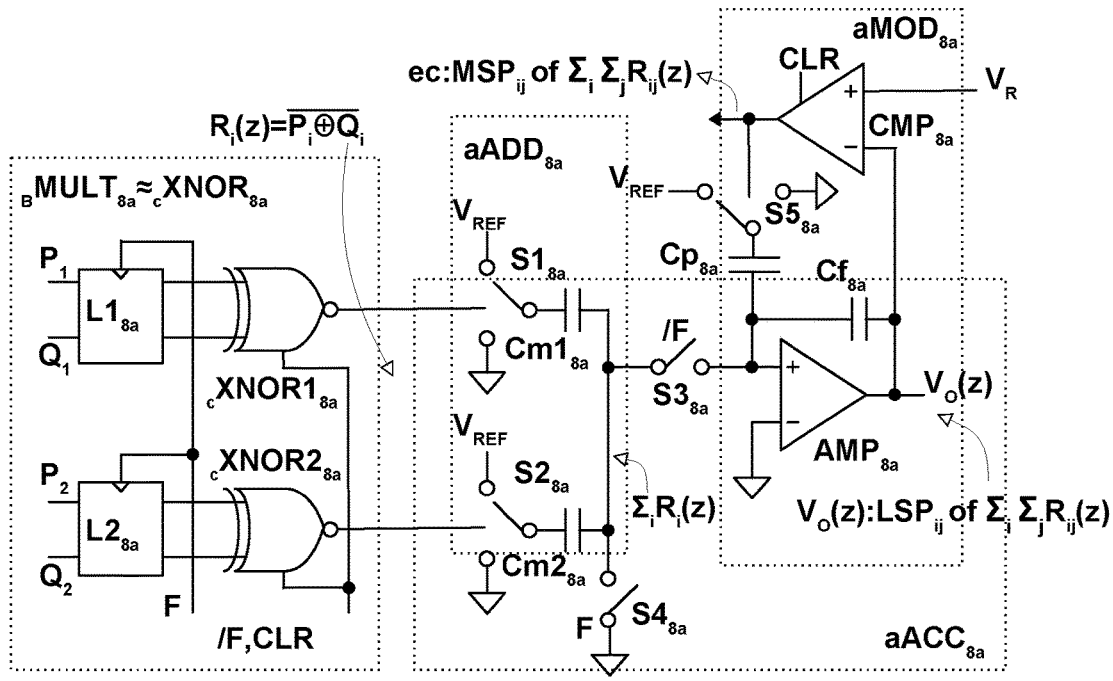
FIG. 8A is a simplified mixed-signal voltage-mode circuit schematic illustrating a simplified Binary Neural Network (BNN) that utilizes another programmable-hybrid-accumulator embodiment of the Z-signal flow diagram of FIGS. 7A and 7B, wherein the programmable-hybrid-accumulator comprises aMOD$_{8A}$ & aACC$_{8A}$. The simplified illustration depicts a programmable-hybrid-accumulator intertwined with (an exemplary BNN with 2 channels of XNOR-based multipliers) BMULT$_{8A}$ plus (exemplary switch-capacitor voltage or charge based adder) aADD$_{8A}$ where the BNN is arranged in a single-ended voltage-mode mixed-signal switched-capacitor configuration.

Section 8A—Description of FIG. 8A

FIG. 8A is a simplified mixed-signal voltage-mode circuit schematic illustrating an embodiment of a Binary Neural Network (BNN) that utilizes another programmable-hybrid-accumulator (PHA) circuit like the one illustrated in FIG. 7A and FIG. 7B, wherein the PHA comprises aMOD$_{8A}$ & aACC$_{8A}$. Signals in this embodiment are processed in switched capacitor voltage mode.

Cost-performance of the disclosed BNN is improved by intertwining functions via sharing capacitors and switches among functional blocks. The disclosed PHA in FIG. 8 is intertwined with XNOR-based BNN multipliers (BMULT$_{8A}$) plus a switched-capacitor adder (aADD$_{8A}$), and a switched-capacitor integrator/accumulator (aACC$_{8A}$).

The disclosed BNN in one embodiment is arranged in a single-ended voltage-mode mixed-signal switch-capacitor configuration for descriptive and illustrative clarity, but as discussed in prior sections, a differential embodiment utilizing, for example, differential input-output amplifiers and comparators would provide additional benefits such as better noise rejection, lower drift, less offset, better power supply rejection, and lower switch charge injection.

The embodiment of FIG. 8A depicts only 2-channels and only a single-level aMOD$_{8A}$ circuit via a single comparator CMP$_{8A}$. It is intended for descriptive and illustrative clarity and not as a limitation. In another embodiment, additional channels and a multi-level aMOD function (via a cascaded ADC and DAC) can be accommodated in accordance with the disclosure.

Notice that the circuit operation of aACC$_{8A}$ and aMOD$_{8A}$ are like their respective counterparts described and illustrated in section 7B and FIG. 7B.

In FIG. 8A, the signals F and F̄ are intended to operate as non-overlapping clocks. Moreover, the combination of a plurality of latches (Li$_{8A}$) and a plurality of composite XNORs (cXNORi$_{8A}$) is intended to perform the equivalent function of SW1$_{7B}$ and SW2$_{7B}$ of FIG. 7B. Also, switches S3$_{8A}$ and S4$_{8A}$ in FIG. 8A are intended to perform the equivalent function of SW3$_{7B}$ and SW4$_{7B}$ of FIG. 7B. Bear in mind, the switch capacitors in FIG. 8A are arranged with proper clocking to initialize capacitors during cycles of accumulation.

In the BNN of FIG. 8A, for i between 1 and n channels, a plurality of pairs of Pi and $Q_i$ digital data are latched via a plurality of Li$_{8A}$ and then multiplied via a plurality of composite exclusive NORs (cXNORi$_{8A}$). The outputs of a plurality of cXNORi$_{8A}$s communicate with a mixed-signal population counter (aADD$_{8A}$) that is comprised of a plurality of switching Cmi$_{8A}$ capacitors arranged in an intertwined thermometer switch-capacitor network. As such, batches of (pairs of $P_i$ and $Q_i$) data communicate with their respective cXNORi$_{8A}$s, which control the respective outputs of Si$_{8A}$ switches to either $V_{REF}$ or Ground. Thus, the respective outputs of Si$_{8A}$ switches communicate with a thermometer switched-capacitor network. The thermometer switched-capacitor network performs the bitwise counting, in mixed-mode instead of in the digital domain, wherein effectively the respective cXNORi$_{8A}$ output states of '1' (corresponding to $V_{REF}$) and '0' (corresponding to Ground) are stored and added in mixed-signal through their respective $Cmi_{8A}$ switched capacitors.

Similar to the description provided in section 7B, (at the output ports of $uMULT_{8A}$) the respective bitwise '1' signals attributed to $R_i(z) = \overline{P_i \oplus Q_i}$ are loaded onto their corresponding $Cmi_{8A}$ switched capacitors, whose summation or $$\sum_{i=1}^{n} R_i(z)$$

is accumulated, integrated, and held on a feedback capacitor $Cf_{8A}$. When a plurality of batches of $$\sum_{i=1}^{n} R_i(z)$$

are time-multiplexed onto the accumulator for j time, and at the end of the accumulation cycle, a hybrid signal $$\sum_{j=1}^{m}\sum_{i=1}^{n} R_{ij}(z)$$

is generated that is comprised of an $LSP_{ij}$ of $$\sum_{j=1}^{m}\sum_{i=1}^{n} R_{ij}(z)$$

represented at the Vo(z) output of $AMP_{8A}$ in the $aACC_{8A}$ circuit, and as an $MSP_{ij}$ of $$\sum_{j=1}^{m}\sum_{i=1}^{n} R_{ij}(z)$$

represented at the EC output of $CMP_{8A}$ in the $aMOD_{8A}$ circuit.

In another embodiment, to further improve performance (referring to section 7B), the term $$-V_P \times \frac{C_P}{C_F}$$

can be supplied by the same mixed-mode $aADD_{8A}$ circuit which is the plurality of $Cmi_{8A}$ switched-capacitor network. In yet another embodiment, instead of utilizing an independent $C_P$ capacitor that imposes a new mismatch variable, when $V_O(z) > V_{REF}$, different clock phases for $Cmi_{8A}$ capacitors may be programmed to be switched to $V_{REF}$ full-scale (e.g., $V_P = V_{REF}$) which helps to eliminate $C_p$ (and its attributable mismatches) by substituting the $$-V_P \times \frac{C_P}{C_F}$$

term with the aggregate of $Cmi_{8A}$ switch capacitor values or $$-V_{REF} \times \frac{C_M}{C_F}.$$

In yet another embodiment, instead of subtracting a signal proportional to $V_{REF}$ from Vo(z), Vo(z) may be kept from exceeding a programmed signal magnitude limit by altering the gain of the integrator/accumulator which can be accomplished by for example changing the $C_F$.

In addition to the benefits outlined in section 7B, please take note of some of the other benefits summarized in the earlier section titled DETAILED DESCRIPTION that are applicable here.

Figure 8B:
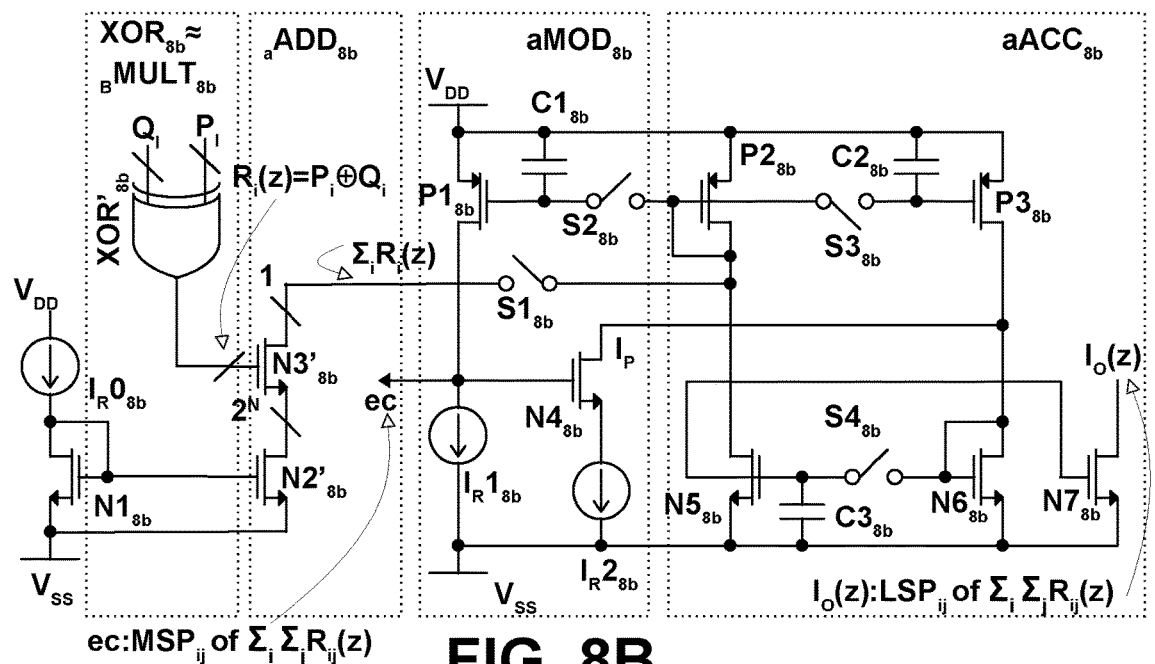
FIG. 8B is a simplified mixed-signal current-mode circuit schematic illustrating another simplified Binary Neural Network (BNN) that utilizes another programmable-hybrid-accumulator embodiment, wherein the programmable-hybrid-accumulator comprises an aMOD$_{8B}$ & aACC$_{8B}$. The programmable-hybrid-accumulator is intertwined with (an exemplary BNN with $2^N$ channels of XOR-based multipliers) BMULT$_{8B}$ plus (exemplary current-mode adder) aADD$_{8B}$ where the BNN is arranged in a single-ended current-mode mixed-signal switched-current configuration.

Section 8B—Description of FIG. 8b

FIG. 8B is a simplified mixed-signal current-mode circuit embodiment illustrating another Binary Neural Network (BNN) that utilizes another programmable-hybrid-accumulator (PHA), wherein the programmable-hybrid-accumulator comprises an $aMOD_{8B}$ & $aACC_{8B}$. Signals in this embodiment are processed in switched current mode. The disclosed PHA is intertwined with (an exemplary BNN with $2^N$ channels of XOR-based multipliers) $BMULT_{8B}$ and (exemplary current-mode adder) $aADD_{8B}$ where the BNN is arranged in single-ended current-mode mixed-signal switched-current configuration.

FIG. 8B illustrates a BNN that is depicted in a single-ended configuration for descriptive and illustrative clarity. In another embodiment, a differential input-output switching current-mode integrator/accumulator for $aACC_{8B}$ circuit as well as a differential modulo operator for its $aMOD_{8B}$ circuit may be utilized. A differential arrangement would provide higher levels of accuracy such as better noise rejection, lower drift, less offset, better power supply rejection, lower switch charge injection, and lower signal-dependent charge injection. In yet another embodiment, a multi-level instead of single-level current-mode modulo operation may be arranged around the feed-back loop of the accumulator in accordance with the cost-performance objectives of the end application.

As discussed in section 3A, the segment inside the dashed-line boxes ($bMULT_{8B}$ and $aADD_{8B}$) illustrates a circuit schematic of a single-ended current-mode multiply-accumulate (iMAC) for binarized neural networks (BNN, see U.S. Pat. No. 10,915,298 issued Feb. 9, 2021). A plurality (of $2^n$) pairs of digital words ($P_i$ and $Q_i$) selectively enable a mixed-signal current-mode $XOR'_{8B}$ circuit to generate a plurality of $R_i(z) = P_i \oplus Q_i$ signals which consequently enables a selected set of equally sized current sources (e.g., $N3'_{8B}$). By coupling the output ports of the selected set of $N3'_{8B}$ current sources, an equivalent bitwise population count function is performed in analog/mixed-mode which generates a $$\sum_{i=1}^{n} R_i$$

current signal.

The accumulator section of programmable-hybrid-accumulator of FIG. 8B is comprised of cascaded current-mode sample-and-holds (each, an iSH) wherein the output of the first iSH is coupled to the input of the second iSH, and the output of the second iSH is coupled back to the input of the first iSH.

Setting aside the role of aMOD$_{SB}$ circuit for now, via an enabled S1$_{SB}$ switch, the first batch of summed $$\sum_{i=1}^{n} R_i$$

current signals is fed onto an input-port (diode-connected gate-drain terminal of P3$_{SB}$) of a first switching current iSH comprising P2$_{SB}$, S3$_{SB}$, C2$_{SB}$, and P3$_{SB}$. The output port of (drain terminal of P3$_{SB}$) is then fed onto input-port (diode-connected gate-drain terminal of N6$_{SB}$) of a second switching current iSH comprising N6$_{SB}$, S4$_{SB}$, C3$_{SB}$, and N5$_{SB}$. The output port of (drain terminal of N5$_{SB}$) of the second iSH is coupled back to the input port of the first iSH to form a switching current-mode integrator/accumulator (aACC$_{SB}$). In one embodiment, the S3$_{SB}$ and S4$_{SB}$ are controlled by out of phase non-overlapping clocks.

Here is the role of the aMOD$_{SB}$ circuit that is comprised of P1$_{SB}$, S2$_{SB}$, C1$_{SB}$, I$_R$1$_{SB}$, I$_R$2$_{SB}$, and N4$_{SB}$: On each cycle, the accumulated batch of sum of $$\sum_{i=1}^{n} R_i$$

current signals are sampled and held via S2$_{SB}$ and C1$_{SB}$ onto P1$_{SB}$ whose current is compared with I$_R$1$_{SB}$. When the current through P1$_{SB}$ exceeds that of I$_R$1$_{SB}$ current, then N4$_{SB}$ turns-on and steers an I$_R$2$_{SB}$ current onto the drain port of P3$_{SB}$, which effectively subtracts from the drain current of P3$_{SB}$ before it is (accumulated) fed back onto the first iSH in the next clock cycle. The value of I$_R$1$_{SB}$=I$_R$2$_{SB}$ currents can be programmed proportional to a reference signal S$_{REF}$=I$_{REF}$.

Accordingly, the final accumulated signal magnitude is bounded by the programmed magnitude of I$_R$1$_{SB}$=I$_R$2$_{SB}$, which can result in the following benefits: First, it helps save on power consumption since bounded current spans translate to bounded current consumption. Second, by effectively transforming the accumulating signal (at the output of the MAC IC) into a hybrid signal (comprising an MSP and an LSP), the span of the accumulating signal is widened without either breaching the V$_{DD}$ operating headroom or causing an overflow condition. Third, faster accumulator response can be achieved given smaller/bounded range of the accumulating signal movement. Fourth, there can be less signal-dependent charge injection within the accumulator/integrator circuit since the accumulated signals swing less. In another embodiment, a switching current differential aMOD$_{SB}$ and aACC$_{SB}$ would substantially improve some of the performance limitations of a single ended aMOD$_{SB}$ and aACC$_{SB}$ that is illustrated here for sake of clarity.

The drain port of N7$_{SB}$ mirrors the N5$_{SB}$ accumulated current representing an LSP$_{ij}$ of $$\sum_{j=1}^{m}\sum_{i=1}^{n} R_{ij}(z)$$

at the current output port I$_O$ of aACC$_{SB}$ circuit, and an MSP$_{ij}$ of $$\sum_{j=1}^{m}\sum_{i=1}^{n} R_{ij}(z)$$

is represented at the EC port of the aMOD$_{SB}$ circuit.

Please take note of some of the other benefits, including those attributed to current mode signal processing, summarized in the earlier section titled DETAILED DESCRIPTION that are applicable here.

What is claimed:

1. A method of performing a spatial-temporal multiply-accumulate (MAC) operation in an integrated circuit, the method comprising:
   Time multiplexing an apparatus to perform a sequence of a plurality of j steps comprising:
      Starting the time multiplexing of the apparatus at a beginning j step;
      Feeding a plurality of digital weight (P$_I$) signals and a respective plurality of digital activation (Q$_I$) signals to a plurality of digital-input to current analog-output multiplier (iMULT) apparatuses to generate a respective plurality of current analog output (P$_I$Q$_I$) signals corresponding to a j step of the plurality of j steps;
      Coupling the (P$_I$) signals and the (Q$_I$) signals to generate a current summation output (ΣP$_I$Q$_I$) signal corresponding to the j step of the plurality of j steps;
      Feeding a digital offset (OFS) signal to a current-mode offset digital-to-analog converter (DAC$_{OFS}$) to generate an offset current (I$_{OFS}$) signal corresponding to the j step of the plurality of j steps;
      Coupling the (ΣP$_I$Q$_I$) signal and I$_{OFS}$ signal to generate a partial current Multiply-Accumulate (iMAC$_P$) signal corresponding to the j step of the plurality of j steps;
      Memorizing the (iMAC$_P$) signal corresponding to the j step of the plurality of j steps by at least one of current-mode sample-and-hold (iSH) apparatus and current-mode Analog-to-Digital Converter (iADC) apparatus;
      Accumulating the (iMAC$_P$) signals corresponding to the j step and j−1 step of the plurality of j steps by at least one of a current-mode accumulator (iACC) apparatus communicating with the (iSH) apparatus and a memory (MEM) apparatus communicating with the (iADC) apparatus;
   Incrementing j by 1 if j<n−1, and returning to the beginning step, otherwise exiting the time multiplexing state machine if j=n−1;
   Generating a final current Multiply-Accumulate (ΣΣP$_{IJ}$Q$_{IJ}$) signal corresponding to j=n−1;
   Wherein 1≤n≤100;
   Wherein 1≤j+1≤100;
   Wherein each of a PQ$_{MIN}$ signal≤the (P$_I$Q$_I$) signal≤a PQ$_{MAX}$ signal;
   Wherein a R$_I$/j signal is half of the sum of the PQ$_{MIN}$ signal and the PQ$_{MAX}$ signal;
   Wherein the (OFS) signal is programmed to be substantially equal to the R$_I$/j signal; and
   Wherein the plurality of (iMULT) apparatuses is configured as at least one of digital-input to current analog-output Binary Neural Network multiplier (iBNN) apparatuses and digital-input to current analog-output multiplying current-mode Digital-to-Analog Converters (iDAC) apparatuses.

2. The method of performing a spatial-temporal multiply-accumulate (MAC) operation in an integrated circuit of claim 1, the method further comprising:

Processing at least one of the $(P_I Q_I)$ signals, $(\Sigma P_I Q_I)$ signals, and the $(\Sigma\Sigma P_{IJ} Q_{IJ})$ signal differentially.

3. The method of performing a spatial-temporal multiply-accumulate (MAC) operation in an integrated circuit of claim 1, the method further comprising:

Combining the $(\Sigma\Sigma P_{IJ} Q_{IJ})$ signal with a bias $(C_K)$ signal to generate an activation $(FK\{\Sigma\Sigma P_{IJ} Q_{IJ} \pm C_K\})$ signal.

4. The method of performing a spatial-temporal multiply-accumulate (MAC) operation in an integrated circuit of claim 1, the method further comprising:

Performing a Programmable Hybrid Accumulation (PHA) operation by generating a Least-Significant-Portion (LSP) of the $(\Sigma\Sigma P_{IJ}.Q_{IJ})$ signal by subtracting at least one mod signal (P) from the $(\Sigma\Sigma P_{IJ}.Q_{IJ})$ signal when $(\Sigma\Sigma P_{IJ}.Q_{IJ} > P)$ is detected, and keeping track of such a detection in an event counter to generate a Most-Significant-Portion (MSP) of the $(\Sigma\Sigma P_{IJ}.Q_{IJ}))$ signal.

\* \* \* \* \*